US00RE39465E

(19) United States
(12) Reissued Patent
Swan

(10) Patent Number: US RE39,465 E
(45) Date of Reissued Patent: Jan. 16, 2007

(54) MODULAR SLEEVE YOKE

(76) Inventor: Richard E. Swan, 171 West St., East Bridgewater, MA (US) 02333

(21) Appl. No.: 10/811,794

(22) Filed: Mar. 29, 2004

Related U.S. Patent Documents

Reissue of:
(64) Patent No.: 6,499,245
Issued: Dec. 31, 2002
Appl. No.: 10/061,515
Filed: Feb. 1, 2002

U.S. Applications:
(63) Continuation-in-part of application No. 10/007,590, filed on Dec. 10, 2001, now Pat. No. 6,490,822.
(60) Provisional application No. 60/274,147, filed on Mar. 9, 2001.

(51) Int. Cl.
*F41C 23/00* (2006.01)

(52) U.S. Cl. ..... 42/71.01; 42/75.01; 42/124
(58) Field of Classification Search ..... 42/71.01, 42/75.01, 124
See application file for complete search history.

(56) References Cited

U.S. PATENT DOCUMENTS 3,939,589 A * 2/1976 Tellie ..... 42/71.01
5,142,806 A * 9/1992 Swan ..... 42/114
5,412,895 A * 5/1995 Krieger ..... 42/75.02
5,826,363 A * 10/1998 Olson ..... 42/75.01
6,453,594 B1 * 9/2002 Griffin ..... 42/105
6,490,822 B1 * 12/2002 Swan ..... 42/71.01

* cited by examiner

*Primary Examiner*—J. Woodrow Eldred
(74) *Attorney, Agent, or Firm*—Barlow, Josephs & Holmes, Ltd.

(57) ABSTRACT

A Swan universal receiver sleeve attached to the top of a firearm upper receiver and extended forward above the firearm barrel to a position just short of the firearm front sight. The underside of the rear portion of the sleeve is fixedly attached to the receiver top. The underside of the forward portion of the sleeve has an upper handguard piece attached thereto. A bottom handguard piece is fitted about the bottom of the gun barrel and is attached to the upper handguard piece. The handguard pieces are not physically connected in any way to the gun barrel. The sleeve is self supported by the connection of the rear portion underside to the receiver top. A special yoke is inserted about the barrel nut of the firearm to which the modular sleeve is attached. The special yoke reinforces the modular sleeve while keeping the firearm barrel free floating.

36 Claims, 22 Drawing Sheets

MODULAR SLEEVE YOKE

Matter enclosed in heavy brackets [ ] appears in the original patent but forms no part of this reissue specification; matter printed in italics indicates the additions made by reissue.

This application is a C-I-P of Ser. No. 10/007,590 filed Dec. 10, 2001, which claims benefit of Prov. No. 60,274,147 filed Mar. 9, 2001.

BACKGROUND OF THE INVENTION

This invention relates to integration means, and more particularly to a device added to a firearm for incorporating ancillary equipment.

As the field of combat and commercial weaponry expands, numerous add-on enhancements have become available for attachment to standard firearms thereby significantly upgrading the capability of the firearm. Various methods and means have been developed for interfacing the various add-on enhancements to firearms. Applicant's U.S. Pat. No. 5,142,806, incorporated herein by reference, discloses a universal receiver sleeve having an upper interface portion with standard, universal dimensions regardless of the firearm and having a lower interface portion specific to a particular firearm.

Although the principles of the above identified patented device are generally applicable to all firearms, the specific firearm example identified in the patent was the U.S. military M16 rifle and carbine. The M16 has been in service for a number of years and will continue to be a popular rifle both in the U.S. military and foreign military for the foreseeable future. However, with the increasing development and refinement of laser technology, it has become highly desirable to integrate laser technology capabilities onto and into firearms, especially the commonly used M16.

The problem with integrating laser technology to firearms is the inherent conflict between a gun barrel's physical functioning and the rigid environment required for laser operations. For maximum results, a gun barrel should be physically isolated, i.e., "floating". It is preferred that nothing be attached to the gun barrel, thereby isolating the barrel physically and eliminating bending and "droop" along the barrel's longitudinal axis. The ideal arrangement for lasers and ancillary optics and electronics is one of complete isolation from the gun barrel. The temperature of a gun barrel in use can rise to 900° F. This type of heat, as well as the physical shock on the gun barrel from firing, will quickly destroy lasers and ancillary optics and electronics.

The heat generated by the gun barrel transfers directly to any devices touching it thereby directly transferring enough heat to burn hands and destroy attached electrical devices. Further compounding this problem is the requirement that gun barrels be extra heavy to support the added weight attached by means of the collars. This in turn means more cantilevered stress on the barrel where it is joined with the M-16's aluminum receiver. The combination of heat and barrel weight tend to pull the barrel chamber out of alignment with the bolt lead, thereby causing bolt lug and extractor failure.

SUMMARY OF THE INVENTION

In view of the foregoing disadvantages inherent in the known types of devices now present in the prior art, the present invention provides a modular receiver sleeving system. As such, the general purpose of the present invention, which will be described subsequently in greater detail, is to provide a new and improved interface means for firearms which will isolate the gun barrel while providing various capabilities for mounting and integrating optics, lasers and sensors.

To attain this, the present invention extends the Swan universal receiver sleeve forward above the firearm barrel to a position just short of the firearm front sight. A weaver type interface return portion may be provided on the underside of the sleeve, or left solid over the barrel in front of the receiver to accommodate solid handguards or modular, dovetailed handguards. The underside of the rear portion of the sleeve is fixedly attached to the receiver top. The underside of the forward portion of the sleeve has an upper handguard piece attached thereto. A bottom handguard piece is fitted about the bottom of the gun barrel and is attached to the upper handguard piece via a unique channel and track system. The handguard pieces are not physically connected in anyway to the gun barrel. The sleeve is self supported by the connection of the rear portion underside to the receiver top. Laser, electronics and optics modules may optionally be attached to the sleeve top side or to the upper handguard piece via special male and female dovetail track devices. The barrel of the rifle is essentially free floating. This permits greater shooting accuracy and protects sensitive electrical components integrated into and onto the firearm via the invention. Lighter weight barrels can be utilized as they are no longer deflected by outside pressure and direct transfer of heat to the hand is also eliminated.

Although the modular sleeve is self supported by the connection of the rear portion underside to the receiver top, additional support may be provided by the addition of a special yoke about the barrel nut of the firearm to which the modular sleeve is attached. The special yoke of the present invention, reinforces the modular sleeve while keeping the firearm barrel free floating.

Specifically, the present invention is a modular sleeve for interfacing modular enhancements to a firearm, said firearm having minimally a receiver with a stock and barrel attached thereto, said barrel defining the forward portion of the firearm and said stock defining the rearward portion of the firearm, said firearm longitudinal axis being defined as horizontal and running from said stock through said receiver to said barrel, said receiver having a forward portion, a top and a rearward portion, said barrel being joined to the forward portion of the receiver, said stock being joined to the rearward portion of the receiver. The modular sleeve is made up of a universal receiver sleeve having a top side, an underside and two opposite sides connecting said top side with said underside, said universal receiver sleeve being further defined as having a forward portion and a rear portion, the underside of the rear portion of the universal receiver sleeve being fixedly attached to the firearm receiver top, said receiver sleeve forward portion extended forward above the firearm barrel. The modular sleeve has an upper handguard piece with a front, rear, top, open bottom, opposing sides, outer side surfaces and inner side surfaces, said top, sides and bottom defining a hollow interior, said front and rear defining an upper handguard piece longitudinal axis, said upper handguard piece top being joined to the underside of the forward portion of the receiver sleeve. The modular sleeve also has a bottom handguard piece having a front, rear, open top, bottom, opposing sides, outer side surfaces and inner side surfaces, said bottom, sides and top defining a hollow interior, said front and rear defining a bottom handguard piece longitudinal axis, said bottom handguard piece being removably attached to the upper handguard piece. The upper handguard piece and attached bottom handguard piece surround the firearm barrel without touching said barrel. A special yoke is positioned about the firearm barrel nut of the firearm to which the modular sleeve is attached, said upper handguard piece rear being attached to said special yoke. The special yoke is held in place on the barrel nut by attachment to the modular sleeve and the barrel nut. The special yoke may be further held in place by a delta ring with those firearms with a handguard delta ring.

The present invention provides a foundation for integrated laser fire control devices, sensors, communications, and a vast array of quickly attached ancillary devices, such as standard night vision, thermal, shot guns, grenade launchers, and other special systems.

The extra heavy barrels required on conventional rifles and carbines are no longer required with the present invention. A standard heavy or light weight barrel can be utilized because the present invention isolates and prevents hand, sling, and bipod pressure from deflecting the barrel. With the present invention, barrel handguards are not attached to the hot barrels, and provide a much cooler grip for the shooter. Weight reductions of at least one-half pound can be accomplished by use of a light weight barrel and the elimination of conventional solid aluminum and/or plastic handguards and their barrel hardware.

The modular sleeve is attached to the firearm upper receiver in a manner that provides a solid system, attachable or removable by a qualified armorer or a trained soldier. Greater accuracy is accomplished because the firearm has a free floating barrel with the instant invention and thereby no outside forces deflecting point of aim.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
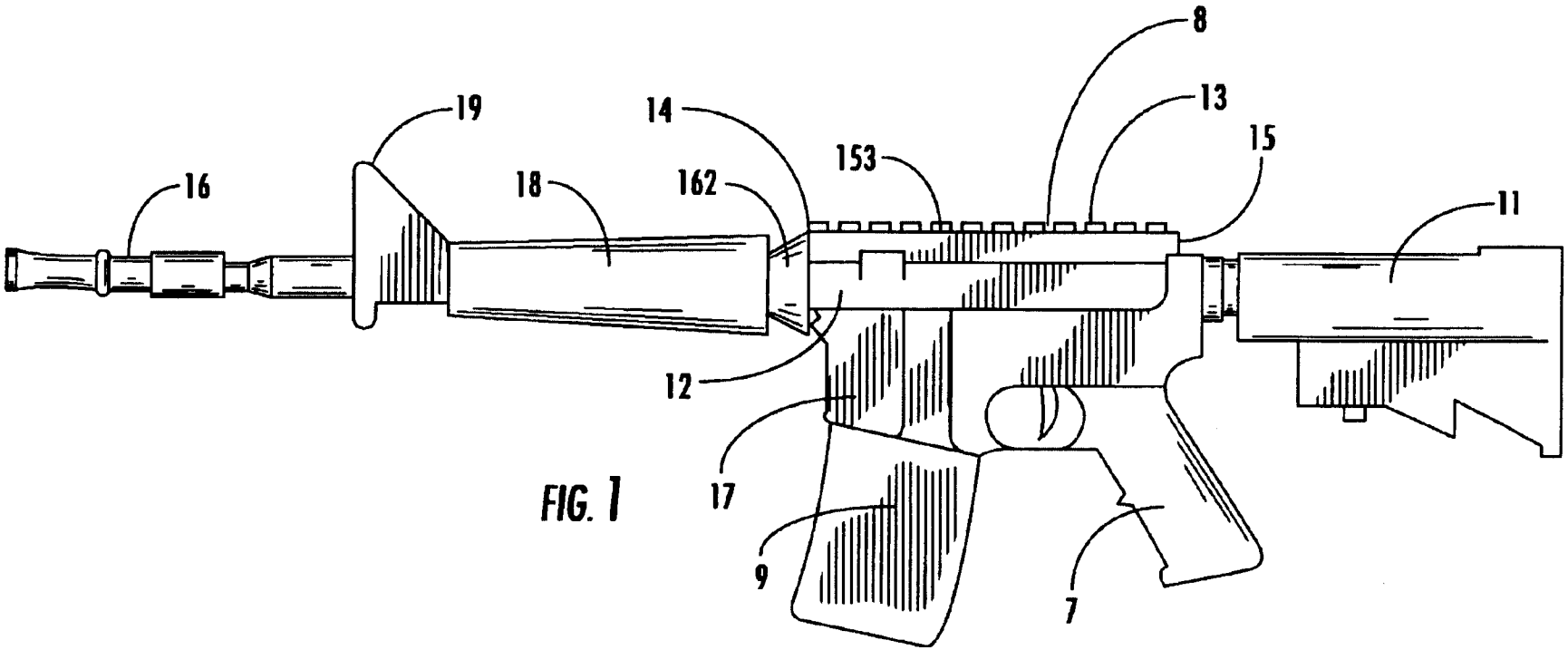
FIG. 1 is a side elevational view of a standard combat firearm.

Referring to the drawings in detail wherein like elements are indicated by like numerals, there is shown in FIG. 1 an outline of a conventional combat firearm 10 having a conventional stock 11, upper receiver 12 with flat top 13, lower receiver 17, barrel 16, pistol grip 7, and magazine 9. The barrel 16 is joined to the upper receiver 12. The barrel 16 defines the forward portion of the firearm 10 and the stock 11 defines the rearward portion of the firearm 10. The longitudinal axis of the firearm 10 runs from stock 11 through receiver 12, 17 to barrel 16. The barrel 16 is joined to the forward portion 14 of the upper receiver 12, i.e., the upper receiver 12 "receives" the barrel 16. The stock 11 is joined to the rear portion 15 of the upper receiver 12. The barrel 16 has protective handguards 18 about its circumference.

Figure 17:
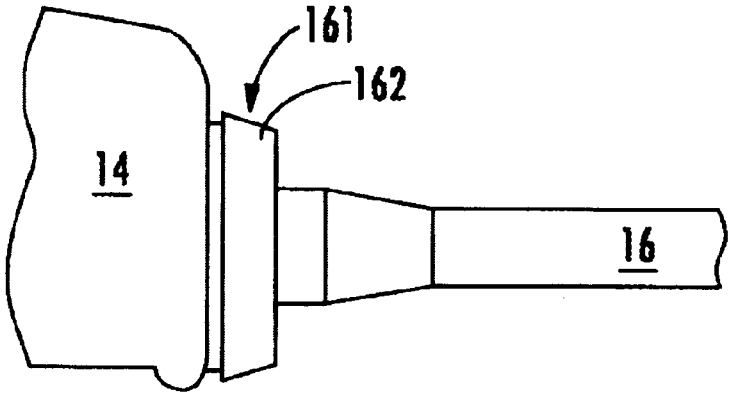
FIG. 17 shows a side elevational view of the connection between the firearm barrel and the firearm receiver.
Figure 18:
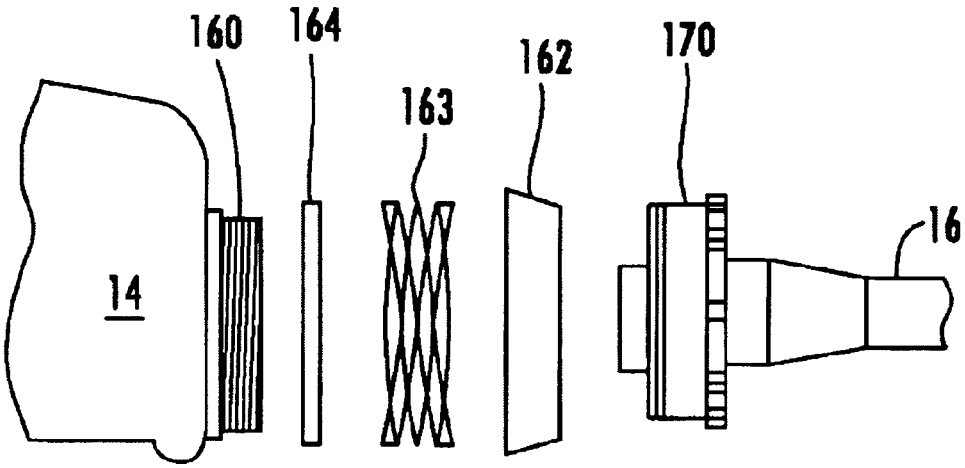
FIG. 18 provides a disassembled, or exploded, view of the parts of the assembly shown in FIG. 17.
Figure 19:
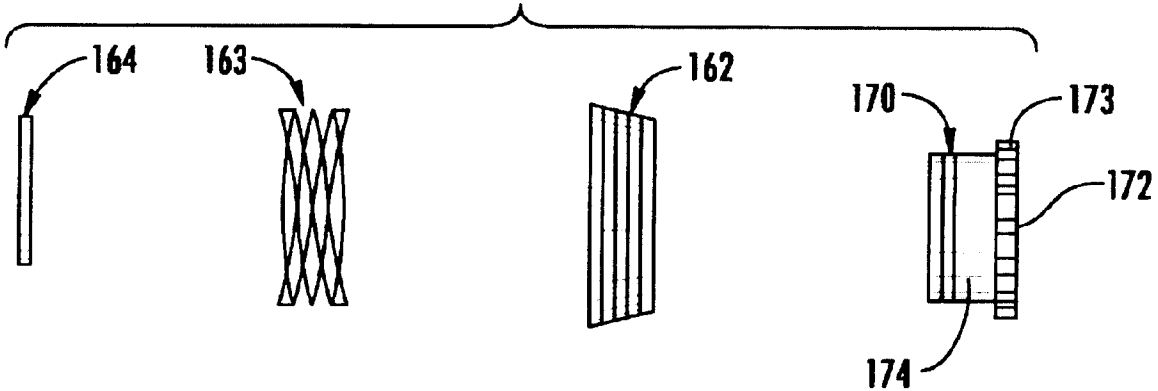
FIG. 19 is a side elevational view of the various parts of the assembly shown in FIG. 18.
Figure 20:
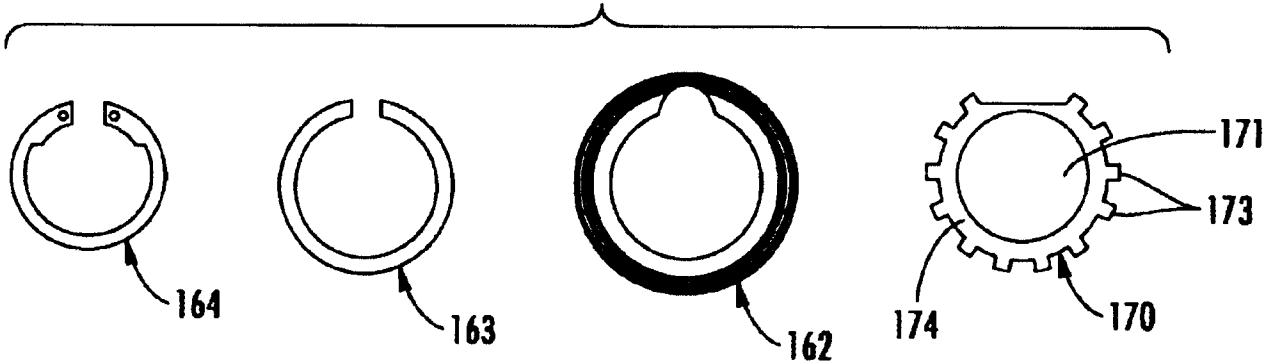
FIG. 20 is a front elevational view of each of the parts shown in FIG. 19.
Figure 21A:
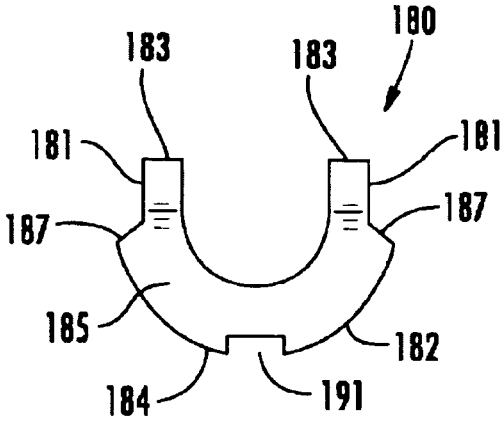
FIG. 21A is a front elevational view of the special yoke of the present invention.
Figure 21B:
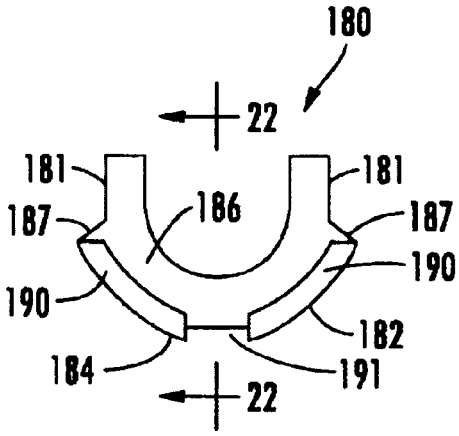
FIG. 21B is a rear elevational view of the special yoke of the present invention.
Figure 21C:
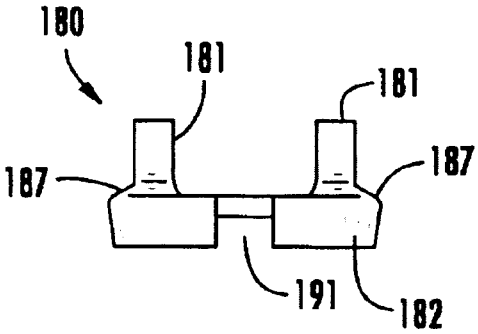
FIG. 21C is a bottom view of the special yoke of the present invention.
Figure 21D:
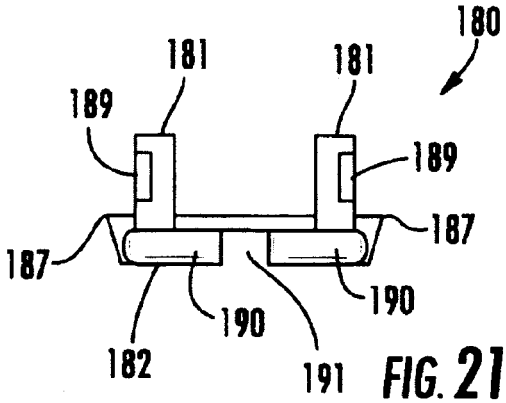
FIG. 21D is a top view of the special yoke of the present invention.
Figure 21E:
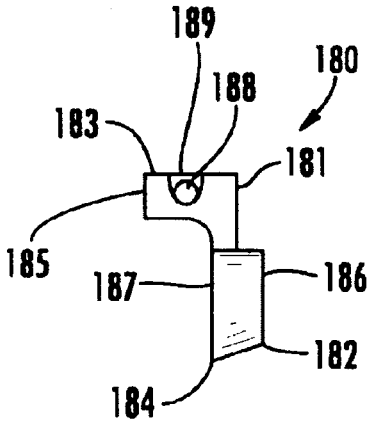
FIG. 21E is a side elevational view of the special yoke of the present invention.
Figure 22:
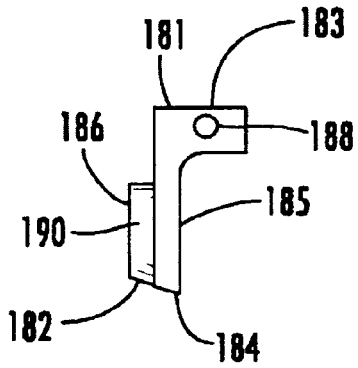
FIG. 22 is a sectional side view along the line 22—22 of FIG. 21B.

As shown more particularly in FIGS. 17–20, the firearm barrel 16 is detachably secured to a screw-threaded barrel port 160 at the front of the upper receiver forward portion 14 by means of a barrel nut assembly 161. The barrel nut assembly 161 is comprised of a barrel nut 170, a delta ring 162, a delta ring spring 163, and a delta ring lock washer 164. The delta ring 162 is used to hold conventional handguards (not shown) in place. As may be best seen in FIG. 20, the tops of the barrel nut 170, delta ring 162, delta ring spring 163 and delta ring lock washer 164 are either notched or open to accommodate the firearm's gas tube (not shown). When the barrel nut assembly 161 is assembled as shown in FIG. 17, the spring 163 urges the delta ring 162 over the barrel nut 170.

The present invention provides a modular sleeve 1 about the firearm barrel 16 replacing the firearm's conventional handguards with a handguard assembly integrated into the modular sleeve 1. The present invention is anchored by the universal receiver sleeve 2 disclosed in applicant's U.S. Pat. No. 5,142,806, issued on Sep. 1, 1992, "Universal Receiver Sleeve", to Richard E. Swan, and incorporated herein by reference.

Figure 2:
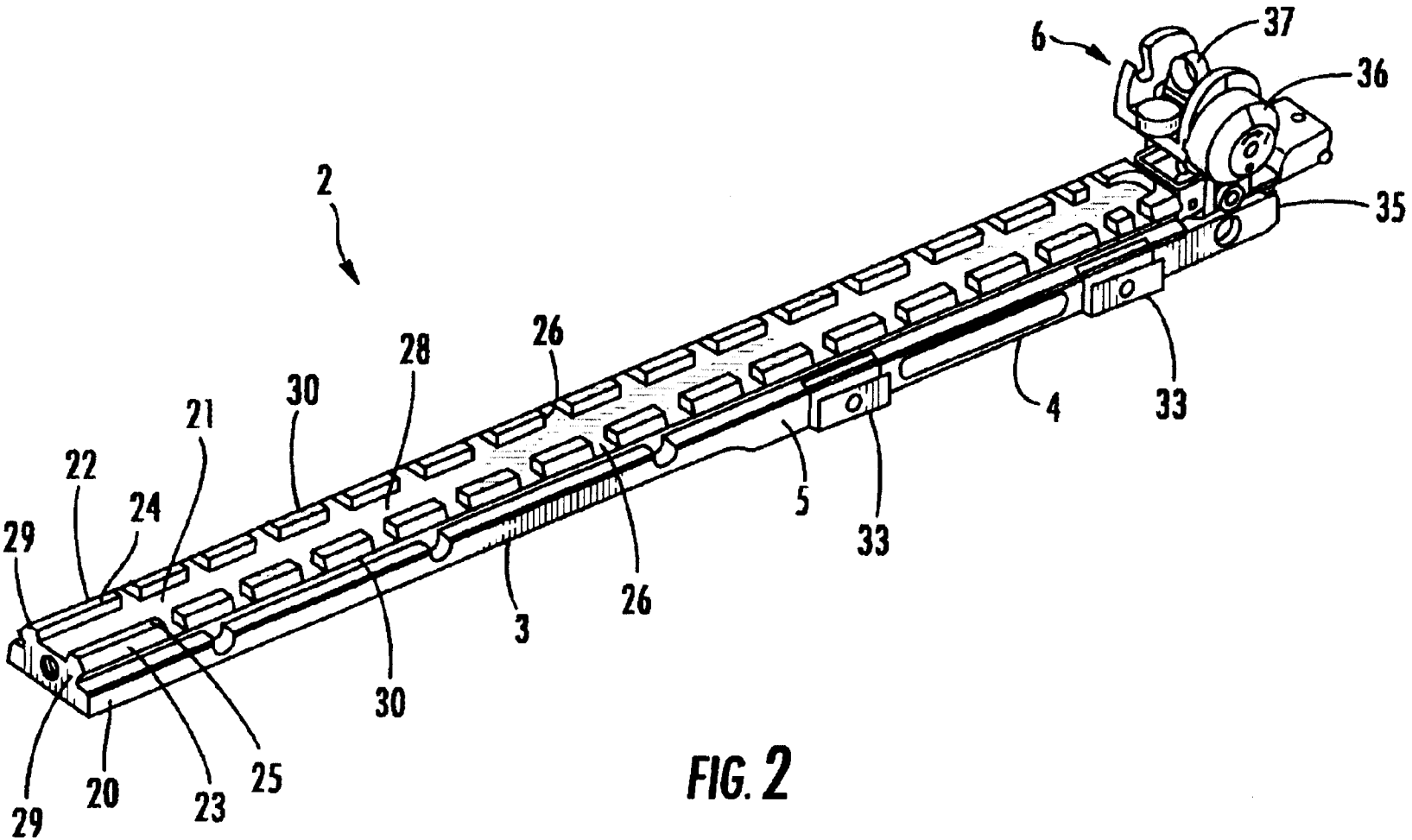
FIG. 2 is a front perspective view of a universal receiver sleeve.
Figure 3:
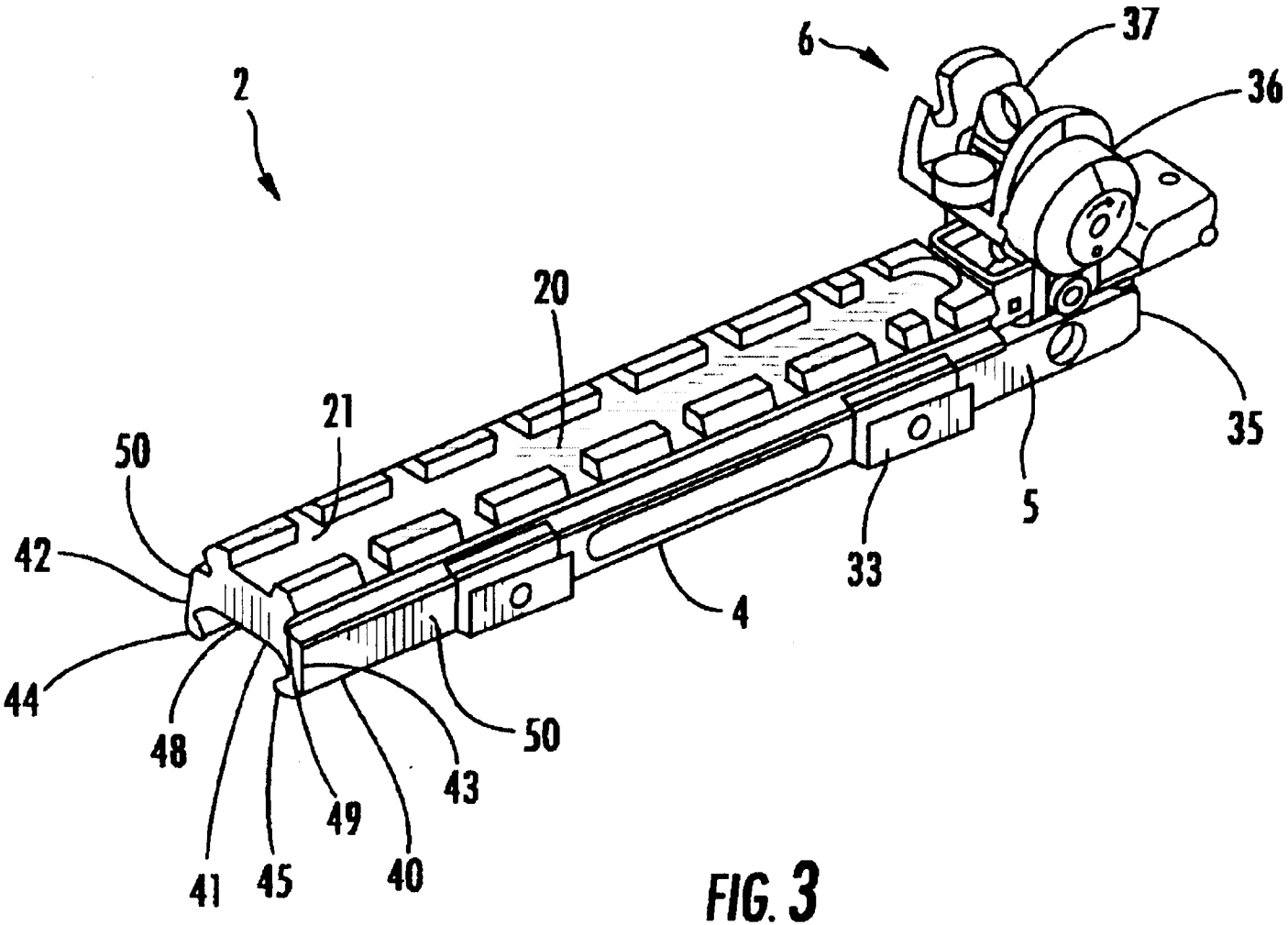
FIG. 3 is a front perspective view of the rear portion of the sleeve of FIG. 2.
Figure 4:
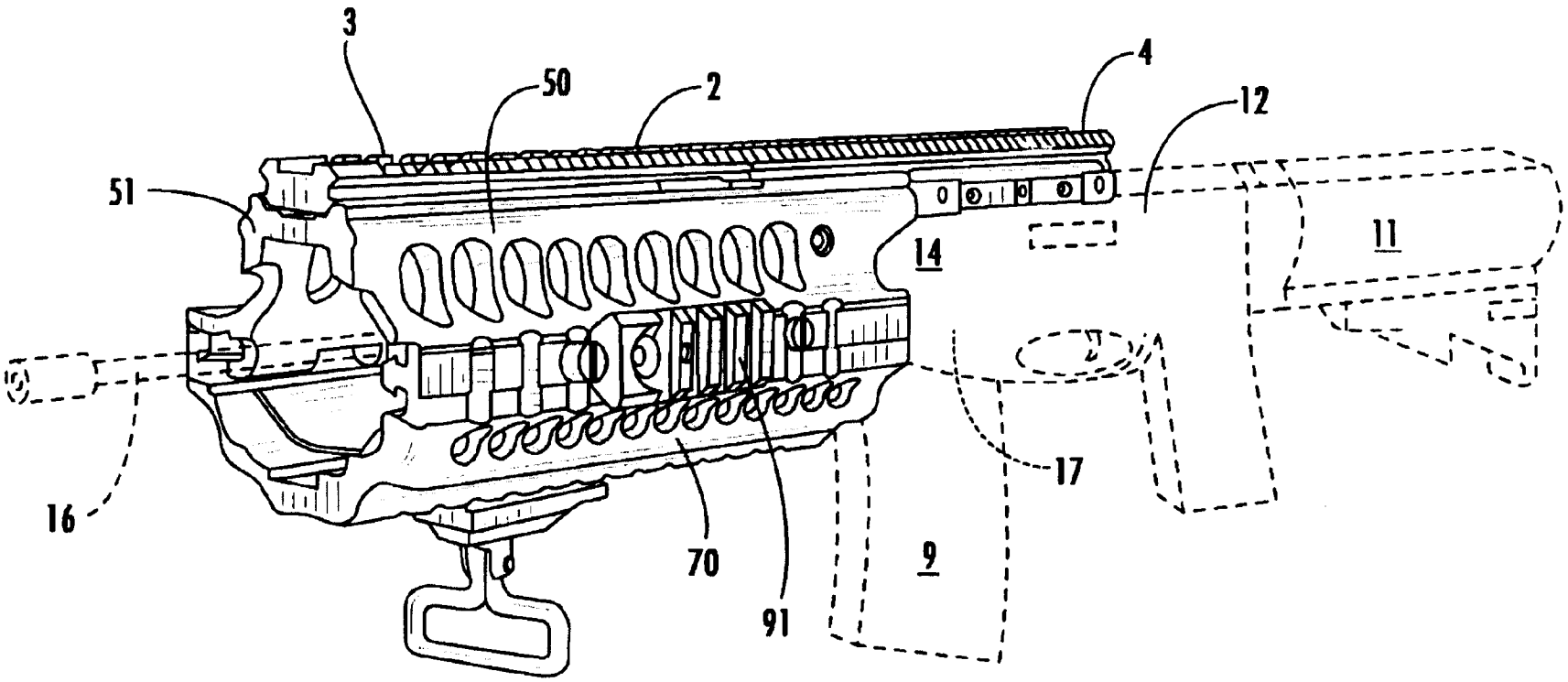
FIG. 4 is a front perspective view of a modular sleeve mounted on a firearm.
Figure 5:
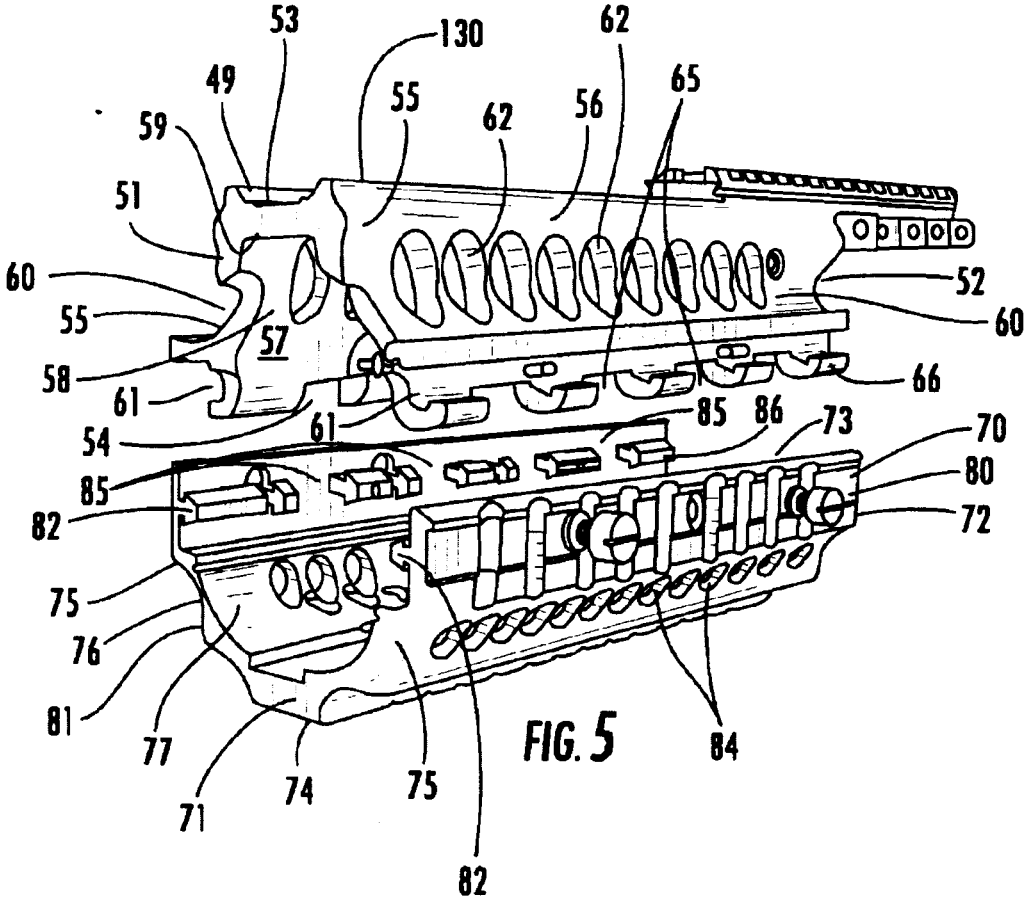
FIG. 5 is a front, exploded perspective view of a modular sleeve.
Figure 7:
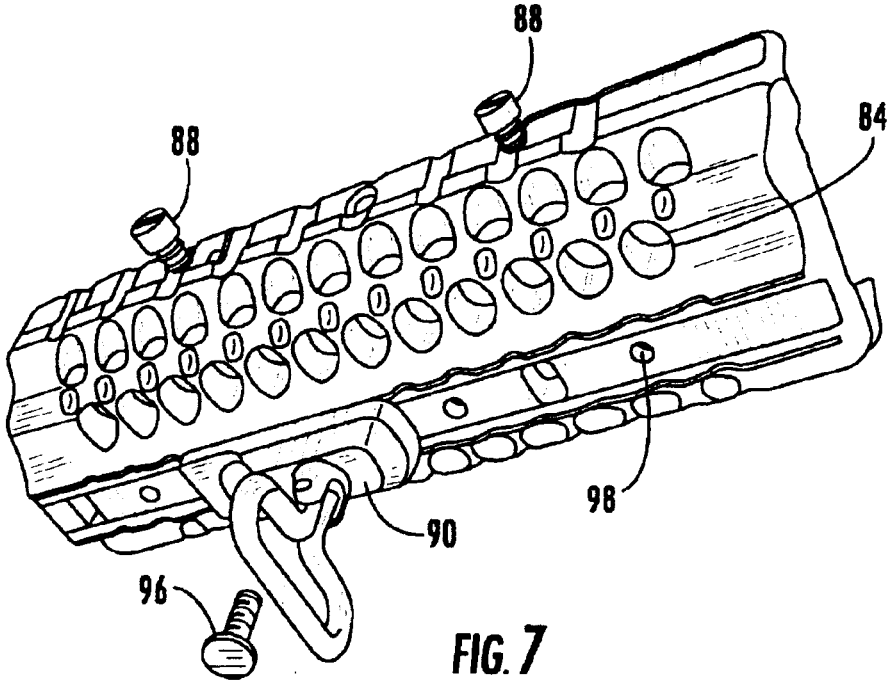
FIG. 7 is a bottom perspective view of the bottom handguard.

Referring more particularly to FIGS. 2 and 3, a universal receiver sleeve 2 is fully illustrated. FIG. 2 illustrates a full universal receiver sleeve 2 comprised of a front portion 3, a rear portion 4 and two sides 5. FIG. 3 illustrates the receiver rear portion 4 only. The receiver sleeve rear portion 4 only is actually joined to the upper receiver 12. The rear portion 4 is attached to the upper receiver 12 by means of one or more fasteners 33 joined through the sleeve sides 5 across the receiver top 13. The sleeve front portion 3 extends forwardly over the firearm barrel 16. The Swan sleeve 2 has a top section 20 (see FIGS. 2 and 3) and a bottom section 40 (see FIG. 3) and a longitudinal axis extending in spaced, parallel relation to the longitudinal axis of the firearm 10. The receiver sleeve top section 20 has a longitudinal, horizontally positioned base portion 21 along its length. The base portion 21 has two long side edges 29. A first longitudinal rail 22 extends upward from the base portion 21 adjacent one of the long side edges 29 and a second longitudinal rail 23 extends upward from the base portion 21 adjacent the other of the long side edges 29. The second rail 23 is in spaced parallel relationship to the first rail 22. A longitudinal opening, i.e., channel 28, is formed between the first and second rails 22, 23. The upper surface 24 of the first rail 22 lies on the same horizontal plane as the upper surface 25 of the second rail 23. Optional notches 26 may also be provided in the rails 22, 23. The notches 26 provide additional means of engaging other components. The quantity and placement of pairs of notches 26 are as required or needed. Each of the two long side edges 29 of the base portion 21 and rails 22, 23 are integral with external angled engagement surfaces 30 which extend the full length of the top section 20.

The receiver sleeve top section 20 is joined to the receiver sleeve bottom section 40. The receiver sleeve bottom section also has a longitudinal, horizontally positioned base portion 41 along its length. The base portion 41 has two long side edges 49. A first rail 42 extends downward from the base portion 41 adjacent one of the long side edges 49 and a second rail 43 extends down-ward from the base portion 41 adjacent the other of the long side edges 49. The second rail 43 is in spaced parallel relationship to the first rail 42. The top section base 21 is joined in a mirrored, face to face relationship to the bottom section base 41. The lower surface 44 of the first rail 42 lies on the same horizontal plane as the lower surface 45 of the second rail 43. Each of the two long side edges 49 of the base portion 41 and the rails 42, 43 are integral with an angled engagement surface 50 which extends the full length of the bottom section 40. A longitudinal resultant channel 48 is formed between the integrated rail-angled engagement surfaces 42, 50 and 43, 50. The cross section shape of the channel 48 will vary from firearm to firearm depending on the upper receiver top 13 contour of the particular firearm. The channel 48 is the interface and engagement means between the receiver sleeve 2 and the firearm 10 or the sleeve 2 and other firearm ancillary elements. The nominal cross section of the channel 48 and the cross section of the receiver sleeve top section 20 are identical. This permits complex integration of various modules to a firearm 10. In this embodiment of the invention the channel cross section provides a weaver type interface return.

The present invention provides for extension of the receiver sleeve 2 forward above the firearm barrel 16 to a position just short of the firearm front sight 19. This is the sleeve front portion 3 described above. The receiver sleeve bottom section 40 may be a weaver type interface or left solid over the barrel 16 in the receiver front portion 3 to accommodate solid handguards or modular, dovetailed handguards. The bottom section 40 of the rear portion 4 of the sleeve 2 has a weaver type interface and is fixedly attached to the receiver top 13. In the present invention the bottom section 40 of the front portion 3 of the sleeve 2 has an upper handguard piece 50 attached thereto. A bottom handguard piece 70 is fitted about the bottom of the gun barrel 16 and is attached to the upper handguard piece 50. The handguard pieces 50, 70 are not physically connected in any way to the gun barrel 16. The sleeve 2 is self supported by the joining of the sleeve rear portion 4 bottom section 40 to the receiver top 13. In another embodiment of the invention shown in FIG. 6A the top of the 53 upper handguard 50 and receiver sleeve bottom section 40 may be integrated into one piece, thereby forming a resulting upper handguard piece top 53, said resulting upper handguard piece top having an upper surface 49 and an undersurface 59. Laser, electronics and optics modules may optionally be attached to the sleeve top section 20 or to the upper handguard piece 50 via special male and female dovetail track devices. The barrel 16 of the firearm 10 is essentially free floating. This permits greater shooting accuracy and protects sensitive electrical components integrated into and onto the firearm. Lighter weight barrels can be utilized as they are no longer deflected by outside pressure and direct transfer of heat to the hand is eliminated.

As may also be seen in FIGS. 2 and 3, in practice, the receiver sleeve rear portion 4 would incorporate a standard non-optical, flip up sight 6 at the rear 35 of the receiver top section 20. Windage and elevational adjustments 36 and 37 may also be included. Although for illustrative purposes the flip up sight 6 is not shown in the modular sleeve figures, as a desired feature, a flip up sight would normally be included with the modular sleeve 1.

Referring more particularly to FIGS. 4–16, the upper handguard piece 50 has a front 51, rear 52, top 53, open bottom 54, opposing sides 55, outer side surfaces 56 and inner side surfaces 57, said top 53 and sides 55 defining an interior 58. The front 51 and rear 52 define the upper handguard piece's longitudinal axis. The top 53 may be formed into a male weaver type interface. Each of the upper handguard side outer surfaces 56 have two longitudinal channels formed therein, i.e., a large and shallow upper channel 60 and a bottom interface channel 61. The concave shape formed in the upper handguard piece by the channel 60 permits heat to escape faster from the firearm barrel area. The channel also permits ancillary equipment to be placed closer to the center line of the barrel bore. The bottom interface channel 61 is positioned near to the bottom 54 and has a general female, T-shaped cross section.

The bottom handguard piece 70 has a front 71, rear 72, open top 73, bottom 74, opposing sides 75, outer side surfaces 76 and inner side surfaces 77, said bottom top 74 and sides 75 defining an interior 78. The front 71 and rear 72 define the bottom handguard piece's longitudinal axis. The bottom 74 may be formed into a male weaver type interface. Each of the bottom handguard side outer surfaces 76 have two longitudinal channels formed therein, i.e., a small and shallow upper channel 80 and a larger, shallow bottom channel 81. The channels 80, 81 provide hand gripping means for a user.

Figure 14:
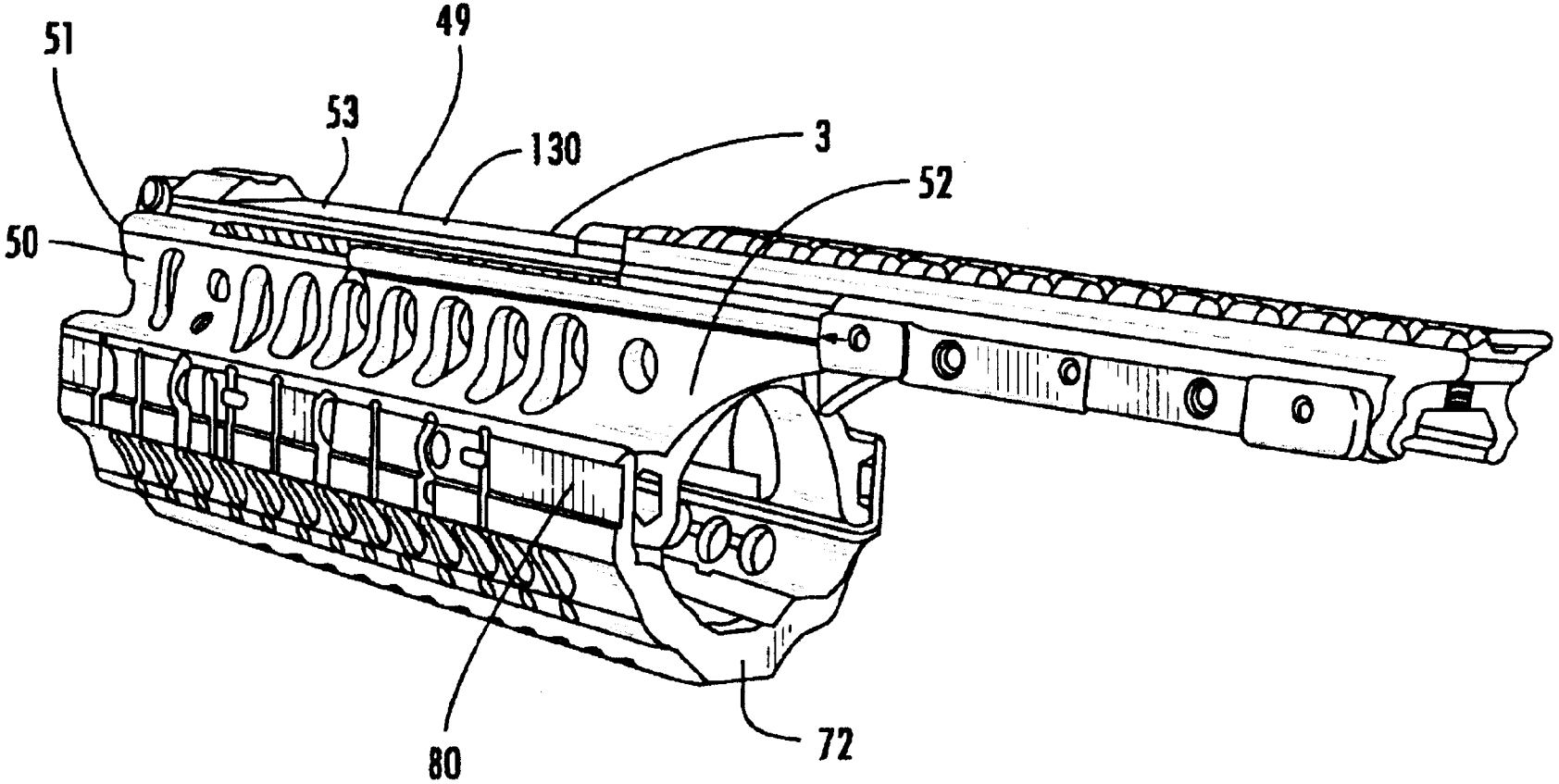
FIG. 14 is a rear perspective view of the modular sleeve.
Figure 15:
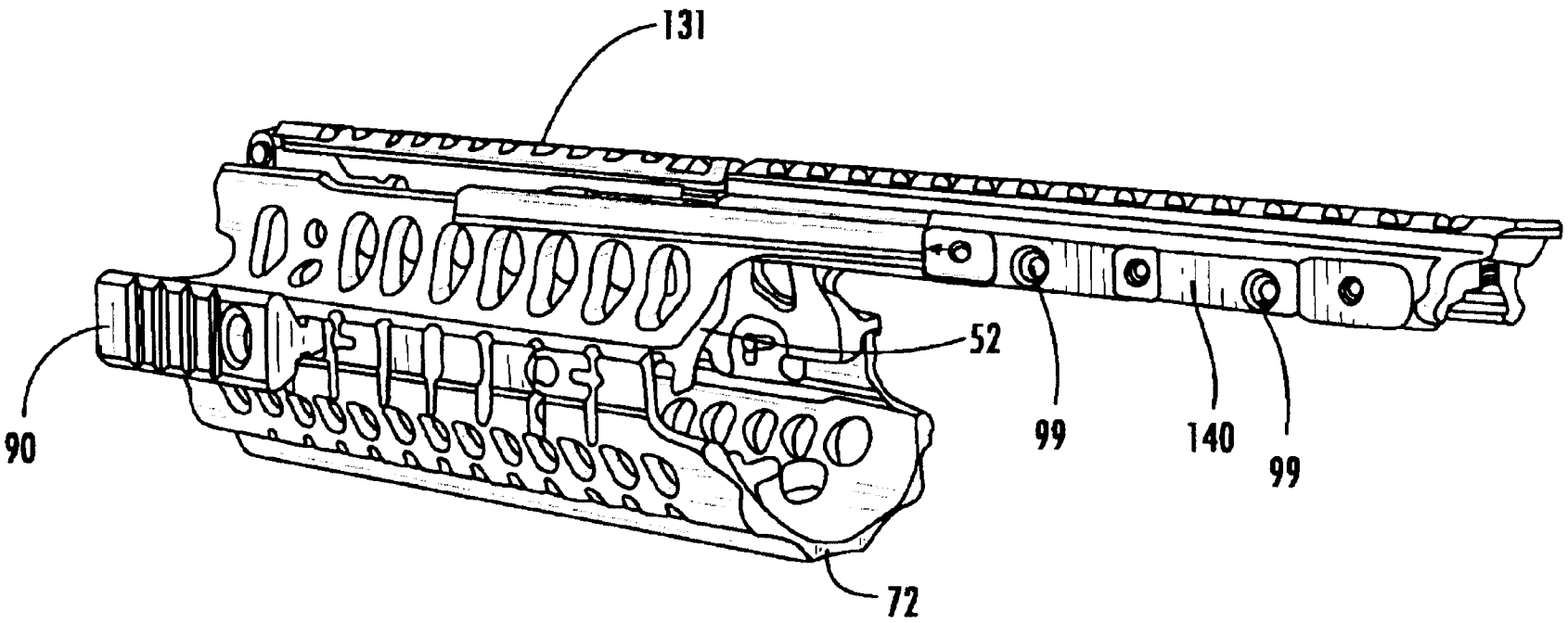
FIG. 15 is a rear perspective view of another embodiment of the modular sleeve.
Figure 16:
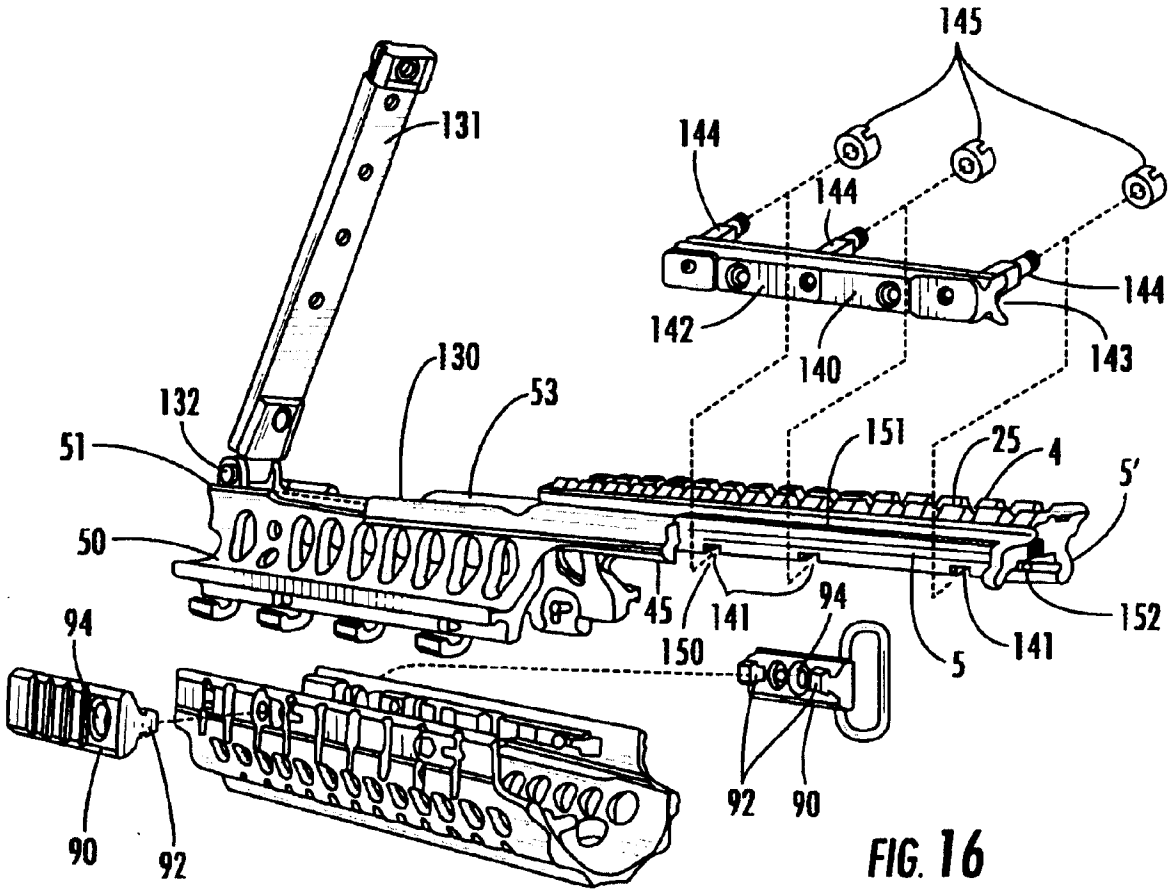
FIG. 16 is an exploded view of the modular sleeve embodiment of FIG. 15.

The upper handguard rear 52 and bottom handguard piece rear 72 may be shaped to accommodate various firearm barrel-receiver connection means. FIG. 14 illustrates an example of a military application for a firearm which has the normal handguard delta ring 162 removed. FIG. 15 illustrates a typical commercial application wherein the firearm normal handguard delta ring 162 has not been removed. This requires that the upper handguard piece rear 52 be cut back more than the military version shown in FIG. 14 in order to accommodate the delta ring 162.

The bottom hand guard inner side surfaces 77 each have a longitudinal T-shaped protrusion 82 position near to the top 73, each protrusion being a mirror of the other. The bottom handguard piece 70 is adapted to being joined to the upper handguard piece 50 by sliding the bottom handguard longitudinal T-shaped protrusion 82 into the upper handguard bottom interface channel 61.

Referring more particularly to FIGS. 9–13 spring-loaded connectors 88 are inserted through the bottom handguard piece sides 75 to hold the handguard pieces 50, 70 in proper alignment.

Apertures 62 may be formed in the upper handguard shallow upper channel 60 for heat ventilating purposes. The upper handguard rear 52 may also be tapered back toward the top 53 to add strength to the invention. Apertures 84 may also be formed in the lower handguard lower channel 81 for heat ventilating purposes.

Figure 6B:
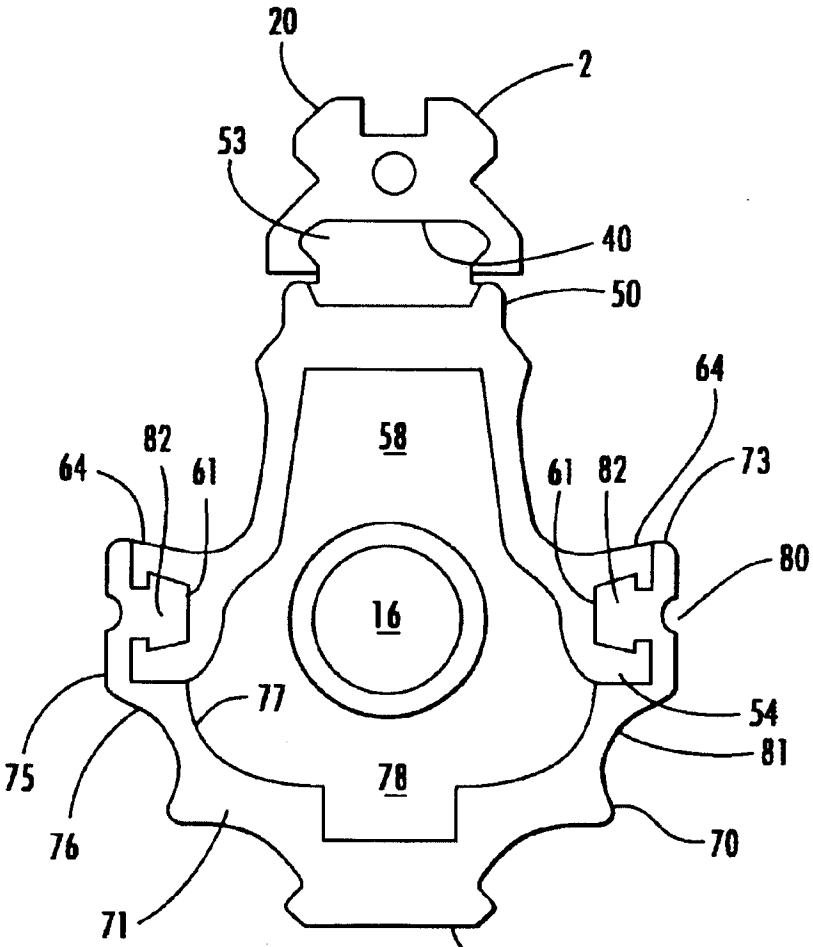
FIG. 6B is a diagrammic front view of another embodiment of a modular sleeve, with bottom handguard attached, positioned about a rifle barrel.
Figure 6A:
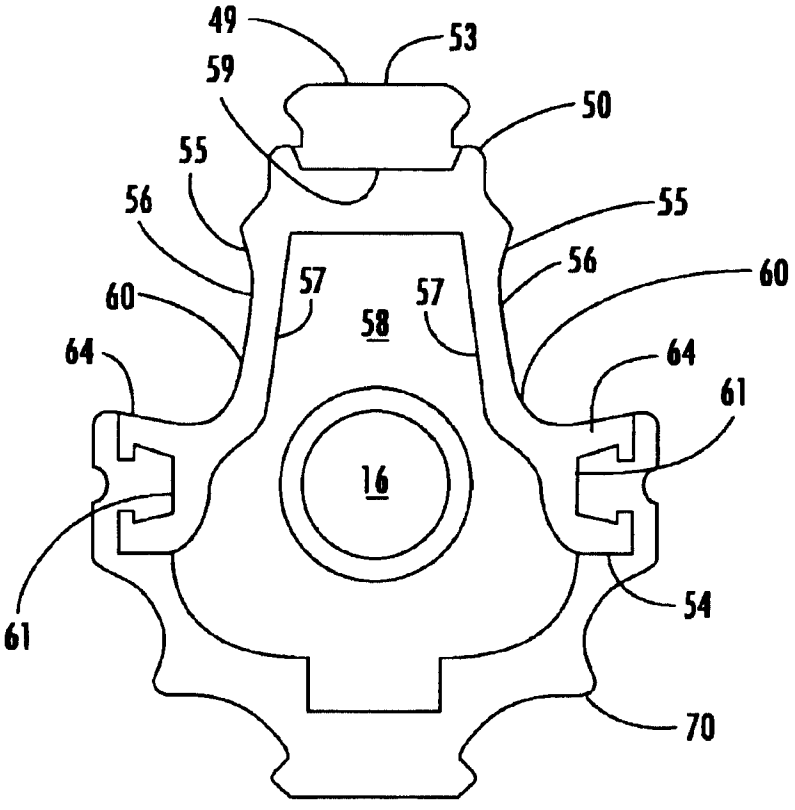
FIG. 6A is a diagrammic front view of a modular sleeve, with bottom handguard attached, positioned about a rifle barrel.
Figure 6C:
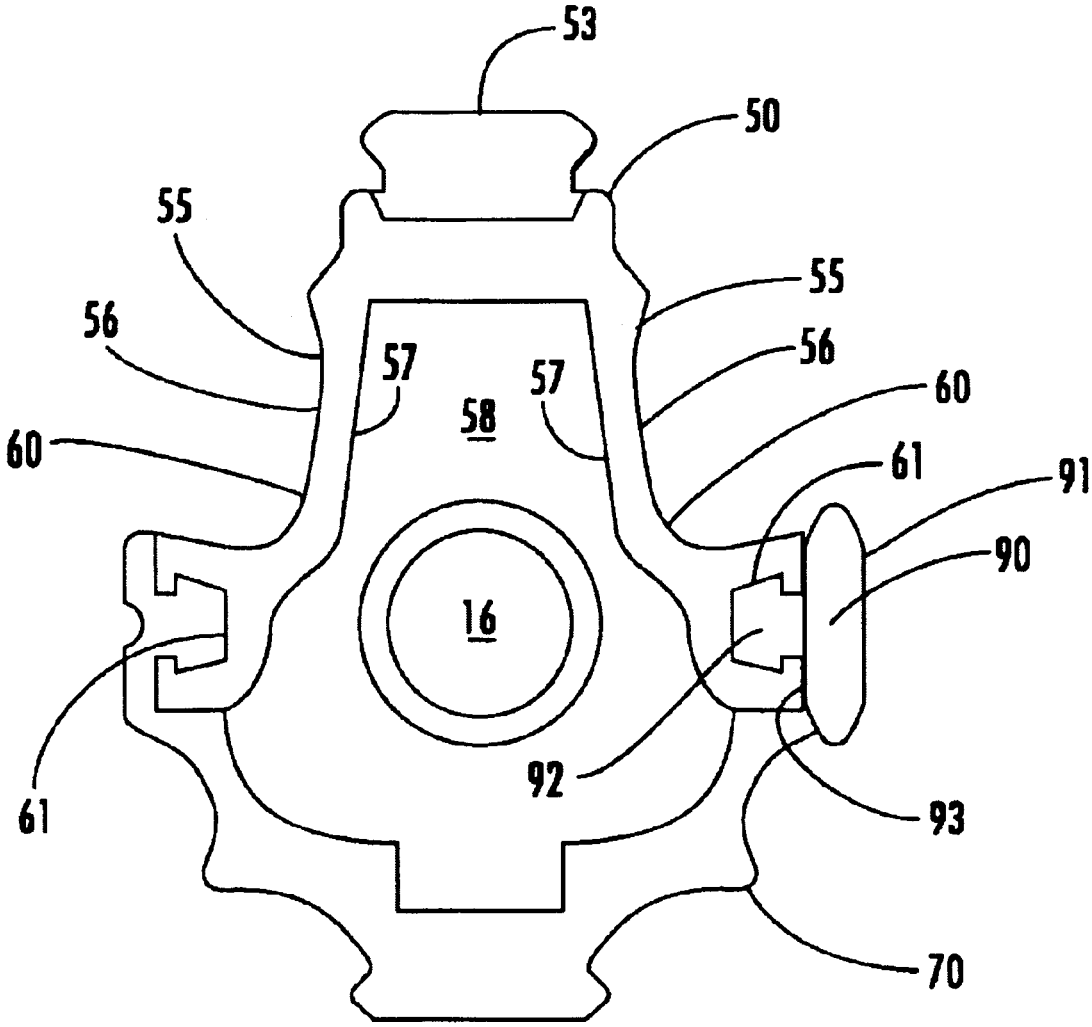
FIG. 6C is a diagrammic front view of the modular sleeve of FIG. 6A with dovetail interface element attached.
Figure 8:
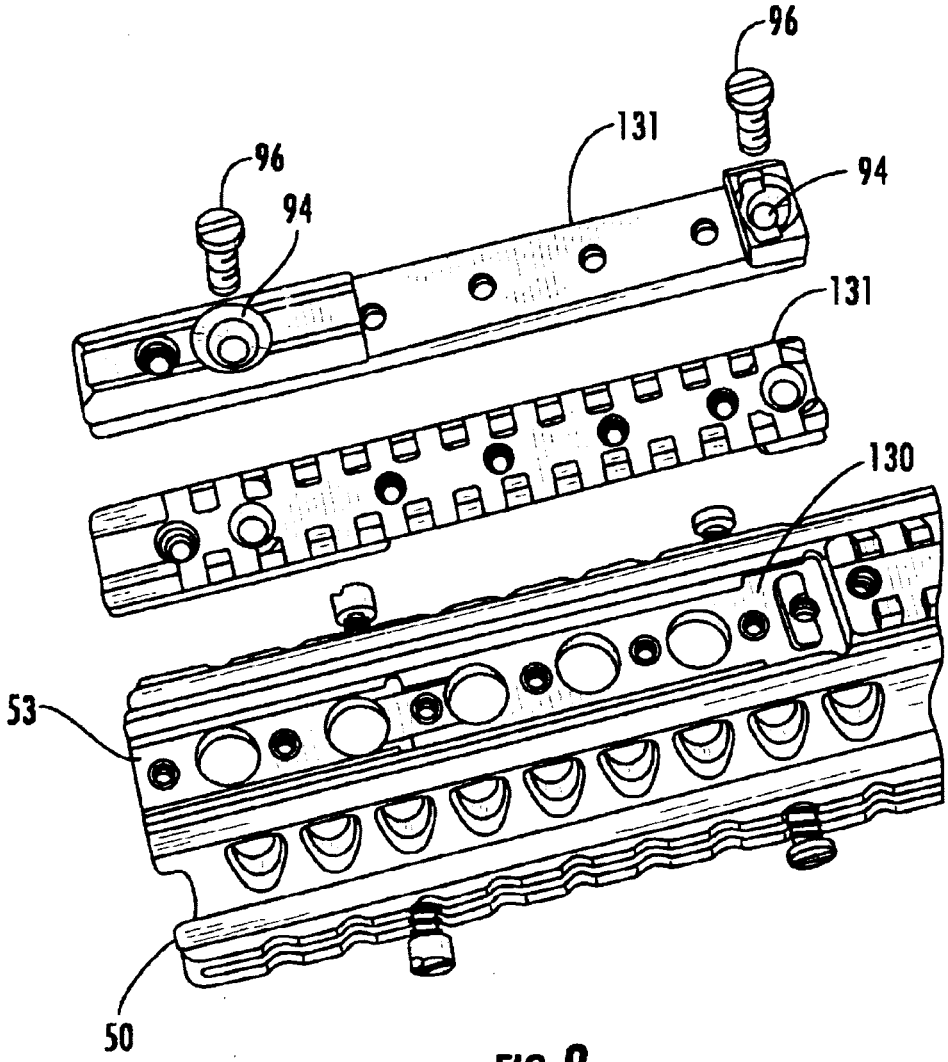
FIG. 8 is a top perspective view of the upper handguard.
Figure 9:
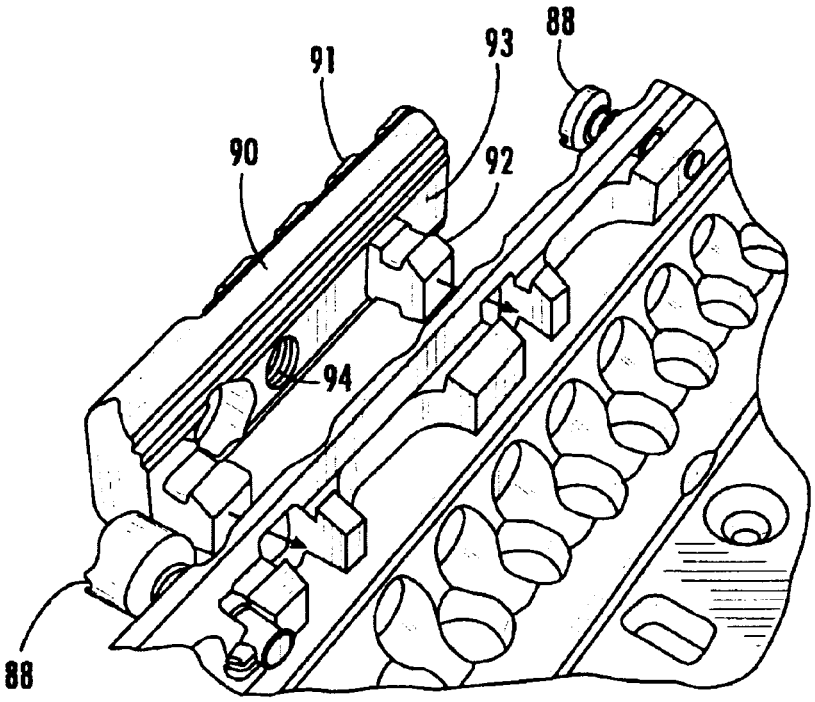
FIG. 9 is a top sectional view of the bottom handguard with exploded attachment element.
Figure 10:
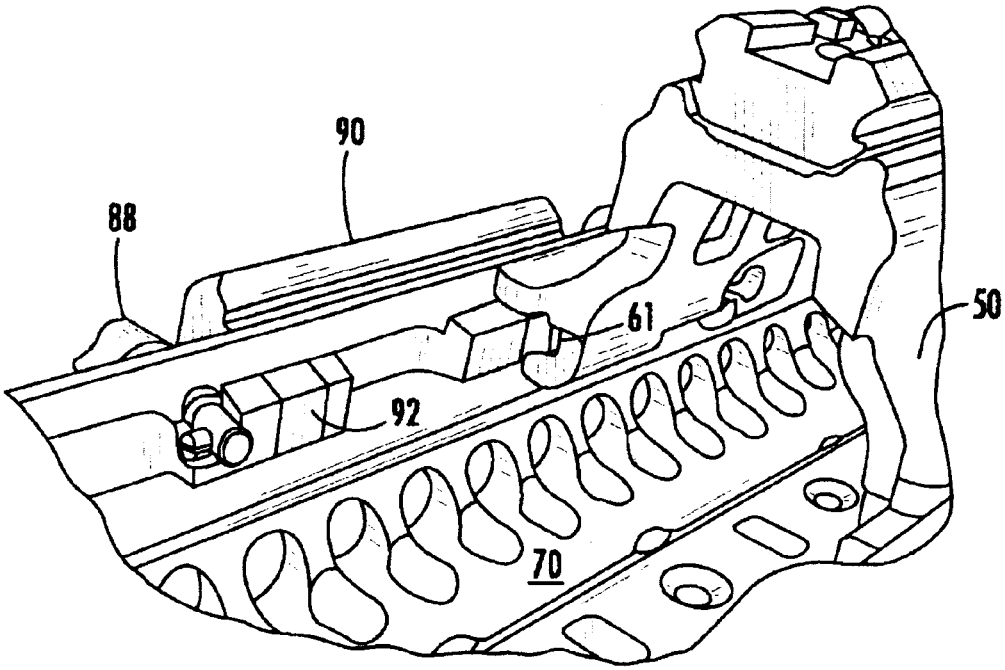
FIG. 10 is a top sectional view of the bottom handguard with attachment element.
Figure 11:
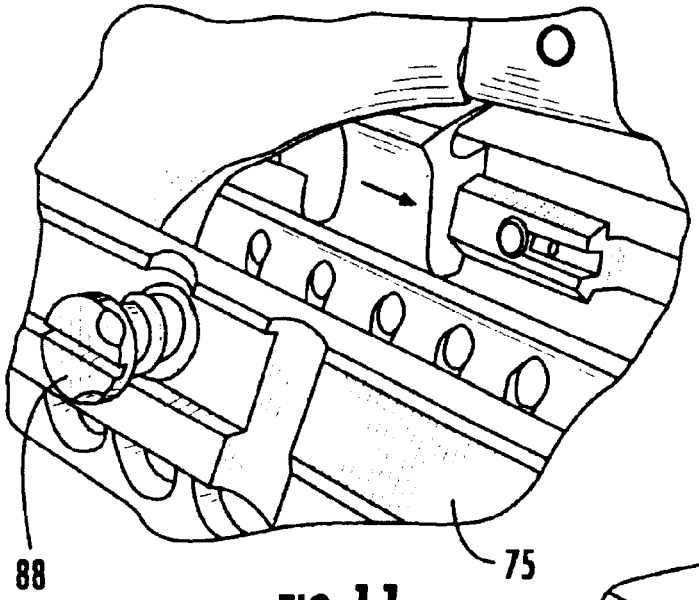
FIG. 11 is sectional view of the interior of the bottom handguard.
Figure 12:
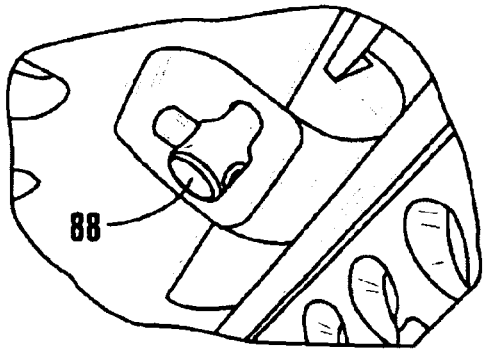
FIG. 12 is a close-up view of a section of the bottom handguard.
Figure 13:
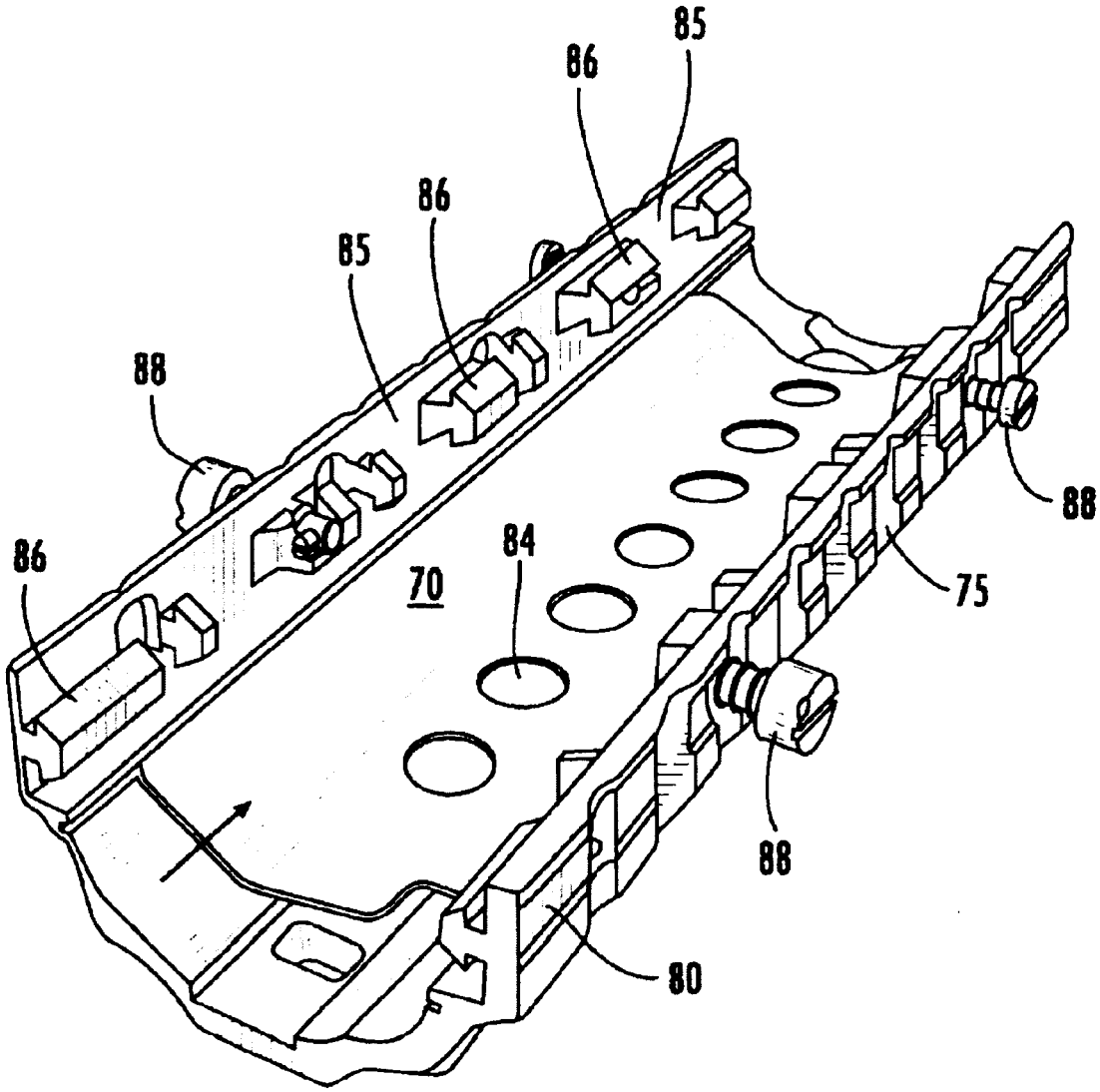
FIG. 13 is a front, top perspective view of the bottom handguard.

Referring particularly to FIGS. 6A and 6B, the lower handguard piece left and right T-shaped protrusions 82 engage the upper handguard piece bottom interface channels 61. In one embodiment of the invention, the bottom handguard piece 70 is positioned fully to the upper handguard piece front 51 and then brought back rearwardly in order to have the lower handguard piece left and right T-shaped protrusions 82 engage the upper handguard piece bottom interface channels 61. To eliminate this requirement, the invention embodiment shown provides for an interrupted interface railing system comprised of cutout portions 65, 85 in the upper handguard interface channel 61 and bottom handguard upper channel 80. Each remaining stud 66, 86 of the interface channel 61 and channel 80 is a nominal ¾ inch in longitudinal length. The cutout portions 65, 85 are also a nominal ¾ inch in longitudinal length. This allows the lower handguard piece 70 to be placed a nominal ¾ inch forward of and in alignment with the upper handguard piece 50. The lower handguard piece 70 is then pulled back rearwardly ¾ inch. The studs 66, 86 then fully engage and lock into one another.

Referring more particularly to FIGS. 5, 6A, 6B, 8, and 14–16, the upper handguard piece top 53 and/or receiver sleeve front portion 3, may have a longitudinal gap 130 formed therein. This permits the direct attachment of various aiming, optical and directed energy devices to the upper handguard top 53, or the attachment of various interface longitudinal elements 131 adapted and configured to join various aiming, optical and directed energy devices to the modular sleeve upper handguard piece top 53. See FIG. 8. The gap 130 provides room to compensate for various height requirements for the various devices. The gap 130 is most clearly shown in FIG. 14. An interface element 131 attached to the gap 130 is most clearly shown in FIG. 15. In another embodiment of the invention shown in FIG. 16, a hinging element 132 is fixed to the upper handguard piece top 53 at the front 51 and is adapted to pivotally join an interface element 131 which may have different attachment configurations on each surface.

Referring more particularly to FIGS. 6C, and 9–13, the modular sleeve is further enhanced wherein several of the studs 86 of the bottom handguard piece 70 are reduced in longitudinal length to a nominal ½ inch. This permits engagement of an external dovetail interface element 90. Each external dovetail interface element 90 has an exterior horizontal surface 91 with a cross-sectional dovetail shape adapted to attach ancillary equipment, and an opposite, generally flat, interior surface 93 having one or more T-shaped protrusion 92 adapted to engage the cutout portions 85 of the lower handguard upper channels 80 and come into alignment with the studs 86 for engagement with the upper handguard interface channel 61. Any number of studs 86 may be modified in any nominal longitudinal length to accommodate dovetail interface elements 90 of varying lengths. The dovetail interface elements 90 also have one or more apertures 94 formed therethrough, said apertures 94 adapted to receive a screw 96. The screw 96 enables a dovetail interface element 90 to be engaged directly to the modular sleeve 1 at one of the apertures 98 formed directly at various points in the modular sleeve 1. The modular sleeve apertures 98 may have helicoils 99 inserted therein to provide threaded engagement with a screw 96.

The receiver top 13 has a plurality of notches 8 formed thereon, each said notch 8 having a rectangular cross section and are formed transverse to the longitudinal axis of the firearm 10. The universal receiver sleeve 2 has an elongated rectangular opening 150 formed in a first universal receiver sleeve opposite side 5, said rectangular opening 150 extending from the universal received sleeve opposite side lower surface 45 a predetermined distance toward the universal receiver top side 25 terminating in a rectangular opening upper edge 151, said rectangular opening upper edge having a plurality of rectangular notches 141 formed therein. The second universal receiver sleeve opposite side 5' has a plurality of apertures 152 formed therein, each said aperture 152 being formed directly opposite a first universal received sleeve opposite side rectangular notch 141.

A sleeve dovetail interface element 140 is provided for engagement with the universal receiver sleeve rear portion 4. The sleeve dovetail interface element 140 has an exterior horizontal surface 142 with a unique cross-sectional dovetail shape adapted to attach ancillary equipment, and an opposite interior surface 143 with a standard dovetail configuration for securing the universal receiver sleeve rear portion 4 to the receiver top 13. There are a plurality of projecting elements 144 formed on the sleeve dovetail interface element interior surface 143, each said projecting element 144 having a rectangular cross-section, said projecting elements 144 adapted to engage the notches 8 across the receiver top 13. The sleeve dovetail interface element interior surface 143 is adapted to engage said universal receiver sleeve opposite side elongated opening 150 and a side 153 of said receiver top 13. The sleeve dovetail interface element interior surface projecting elements 144 are adapted to engage the elongated rectangular opening rectangular notches 141, the receiver top notches 8 and the apertures 152 in said second received sleeve opposite side 5'. Special nuts 145, each adapted to engage a portion of a sleeve dovetail interface element interior surface projecting element projecting through each aperture 152 are also provided. The sleeve dovetail interface element 140 permits devices to be secured to the side of a firearm, adjacent to the upper receiver without interfering with the functions or handling of the firearm.

Referring more particularly to FIGS. 17–25, the firearm barrel 16, is detachably secured to a screw threaded barrel port 160 at the front of the upper receiver forward portion 14 by means of a barrel nut assembly 161. The assembly barrel nut 170 has a generally cylindrical body 174 with a central longitudinal threaded opening 171 permitting the nut to be slid over the firearm barrel 16 and cooperatively engaging a flange (not shown) on the barrel 16. Said barrel nut threaded opening 171 adapted to engage the screw threaded barrel portion 160 at the front of the upper receiver forward portion 14. The barrel nut 170 has a forward end 172 with a number of prongs 173 protruding radially outward from the barrel nut body 174. The barrel nut prongs 173 are adapted to be engaged by a wrench to tighten or loosen the barrel nut 170.

The special yoke 180 is a U-shaped device having two upright elements 181 interconnected by a curvilinear element 182. The special yoke 180 has a top 183, bottom 184, front 185, rear 186 and two opposite sides 187. The curvilinear element 182 contains the yoke bottom 184. The upright elements 181 terminate at the yoke top 183. In this embodiment of the invention, the upright elements 181 are generally rectangular block-like elements protruding forwardly away from the special yoke rear 186. The side 187 of each upright element 181 each has at least one threaded, lateral aperture 188 formed therethrough. Other embodiments could have more than one lateral aperture. The side 187 of each upright element 181 also has an indentation 189 formed therein about each said aperture 188. The indentation 189 is adapted to receive a screw head. The rear 186 of the curvilinear element 182 has a channel flange 190 formed at the yoke bottom 184 opening upward. The channel flange 190 and yoke bottom 184 have a rectangular notch 191 formed therein.

Figure 24:
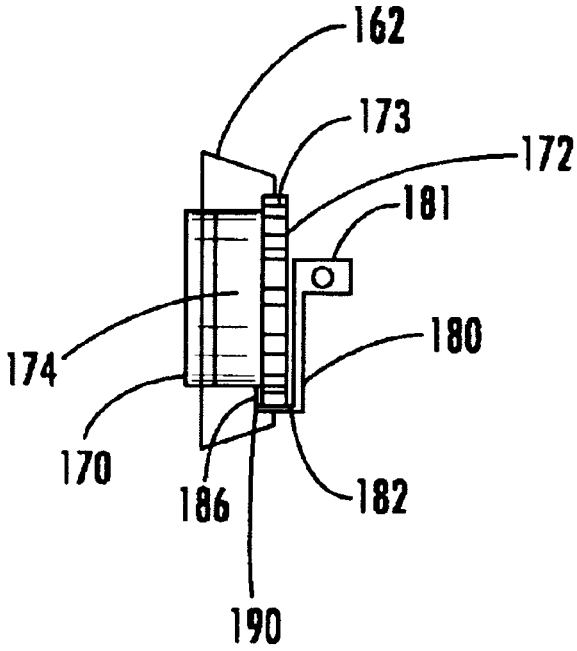
FIG. 24 is a side view, partly in section, of the special yoke engaging the firearm barrel nut.

As may be best seen from FIG. 24, the special yoke 180 is positioned in front of the barrel nut 170 so that the special yoke rear 186 is against the barrel nut forward end 172. The rear 186 of the special yoke channel flange 190 is positioned to engage the barrel nut body 174 while the channel 190 covers the lower half prongs 173 without actually touching the prongs 173. The special yoke of FIG. 22 corresponds to the view shown in FIG. 24.

Figure 25:
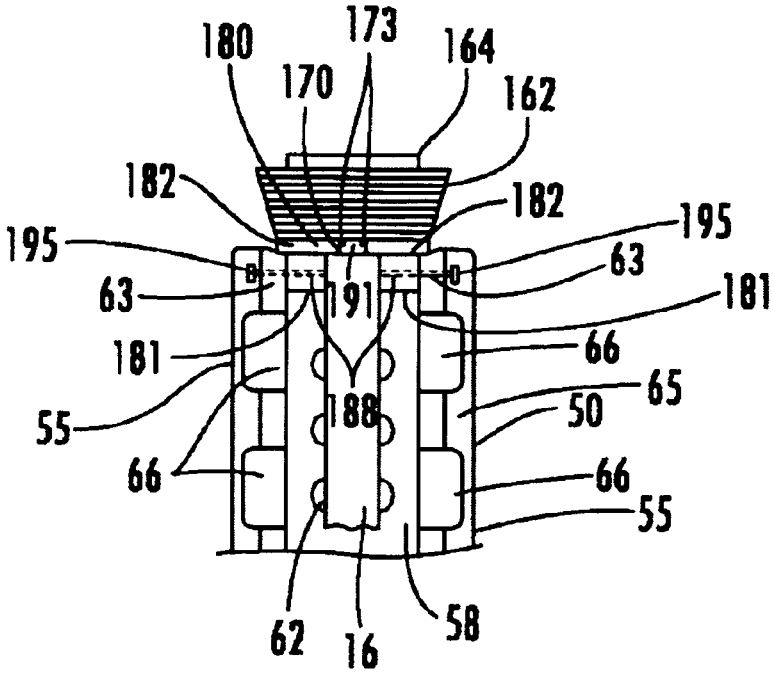
FIG. 25 is a bottom view of the yoke engaged to the barrel nut.

FIG. 25 is a bottom view of the special yoke 180 engaged to the firearm barrel nut 170 with only two prongs 173 visible through the special nut notch 191. The bottom handpiece 70 has been removed and only a portion of the upper handguard piece 50 is visible. As may be seen from both FIGS. 24 and 25, once the special yoke 180 engages the barrel nut 170, the delta ring 162, which is spring loaded and is held back with a screw driver or the like while the special yoke 180 is installed, is released and moves forward substantially covering the barrel nut 170 and a portion of the special yoke 180. The special yoke notch 191 provides access for a screw driver or other tool in manipulating the delta ring 162 and special yoke 180. On those firearms with the delta ring 162 removed, the special yoke 180 is positioned exactly the same way over the barrel nut 170.

Figure 23A:
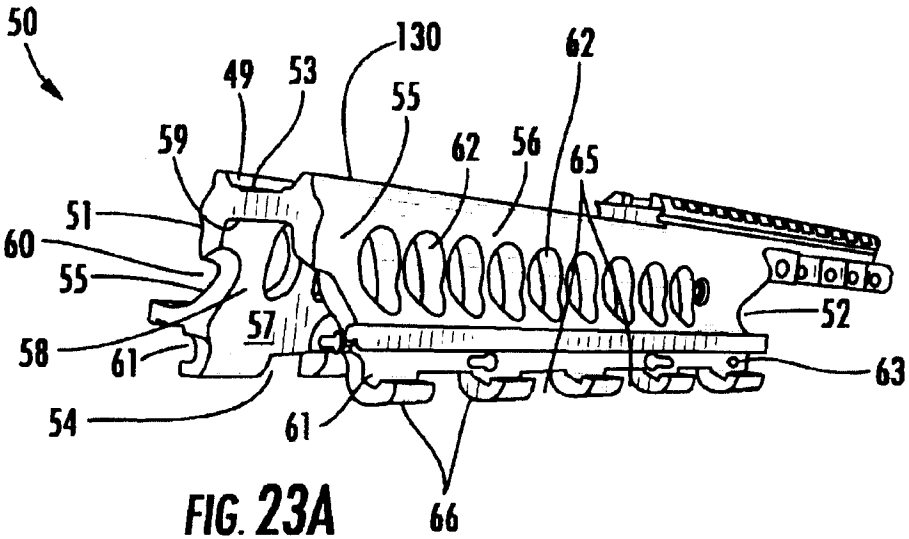
FIG. 23A is a front, perspective view of the upper hand guard piece.
Figure 23B:
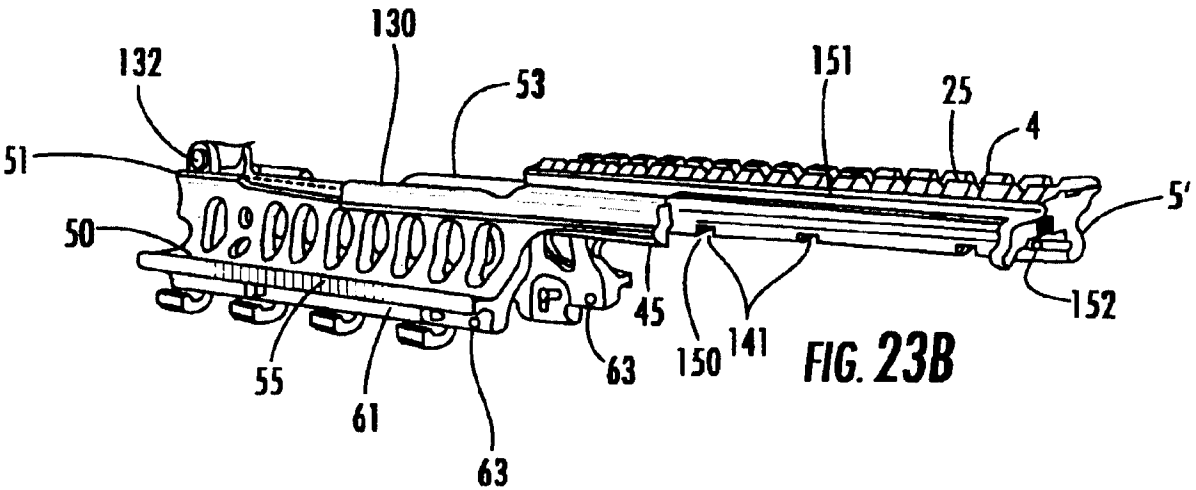
FIG. 23B is a rear perspective view of the upper hand guard piece.

As may be seen from FIGS. 23A and 23B, the upper handguard piece 50 has a small, circular horizontal aperture 63 formed through each upper hand guard piece side 55 near to the rear 52 in the bottom interface channel 61. Referring again to FIG. 25, threaded screws 195 are inserted through the upper handguard piece small, circular horizontal apertures 63 for threaded engagement with the special yoke lateral apertures 188. The upper handguard piece 50 is then supported not only by the rear portion underside 40 to the receiver top 13, but also by the engagement of the upper handguard piece 50 with the special yoke 180. The special yoke 180 is joined to the barrel nut 170 and optionally held in position by the delta ring 162. The special yoke 180 does not touch the firearm barrel 16. Additional downward pressure on the upper handguard piece top 53 translates by means of the special yoke 180 to the firearm barrel nut 170. The firearm barrel nut 170 and special yoke 180 are made from steel thereby slowing down heat transfer from the firearm barrel 16 to the aluminum upper receiver 12.

Figure 26A:
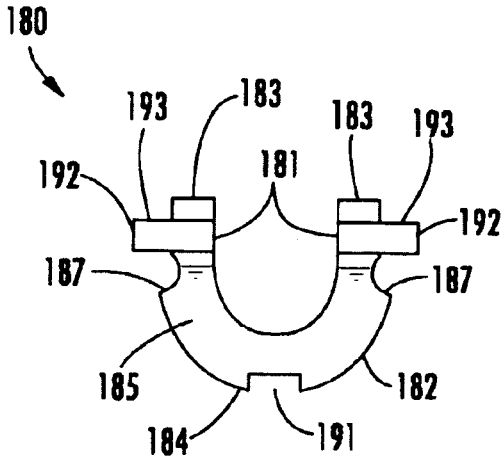
FIG. 26A is a front elevational view of another embodiment of the special yoke of the present invention.
Figure 26B:
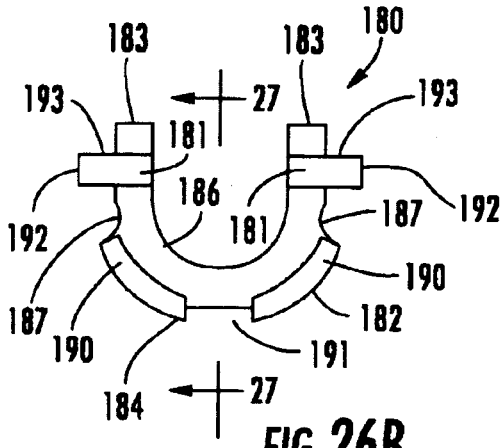
FIG. 26B is a rear elevational view of the special yoke of FIG. 26A.
Figure 26C:
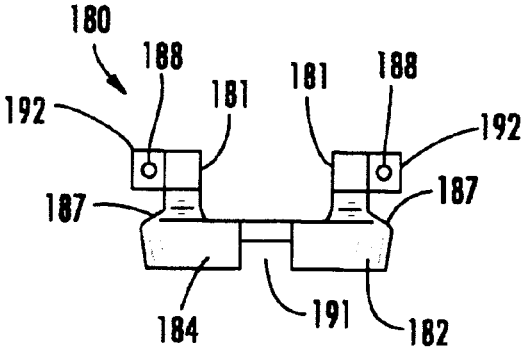
FIG. 26C is a bottom view of the special yoke of FIG. 26A.
Figure 26D:
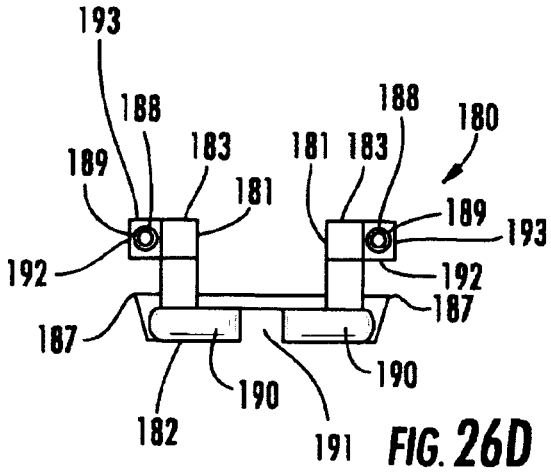
FIG. 26D is a top view of the special yoke of FIG. 26A.
Figure 26E:
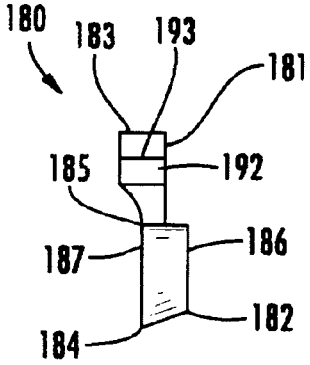
FIG. 26E is a side elevational view of the special yoke of FIG. 26A.
Figure 27:
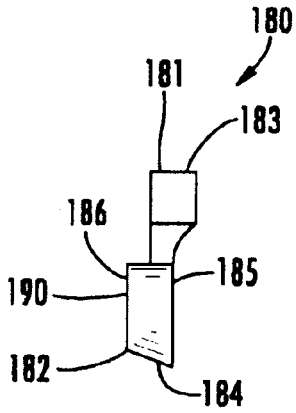
FIG. 27 is a sectional side view along the line 27—27 of FIG. 26B.
Figure 28A:
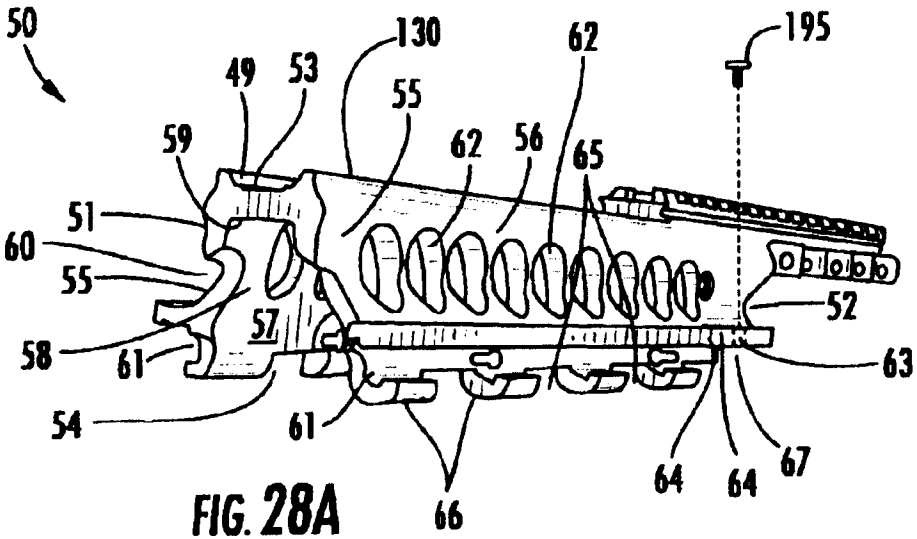
FIG. 28A is a front, perspective view of another embodiment of the upper hand guard piece.
Figure 28B:
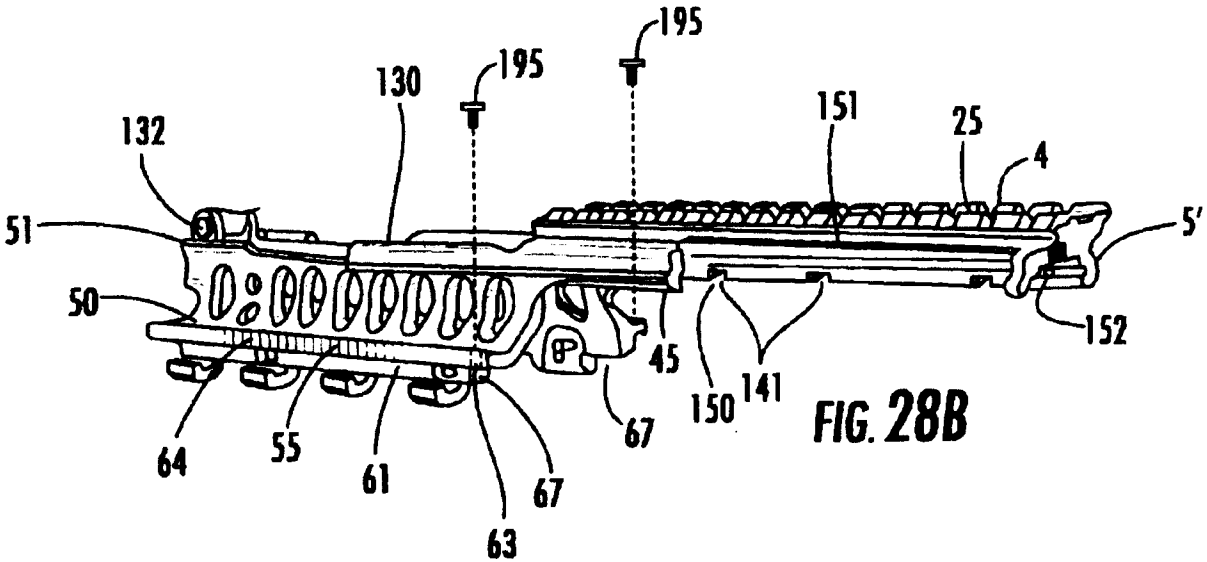
FIG. 28B is a rear perspective view of the upper hand guard piece of FIG. 28A.
Figure 29:
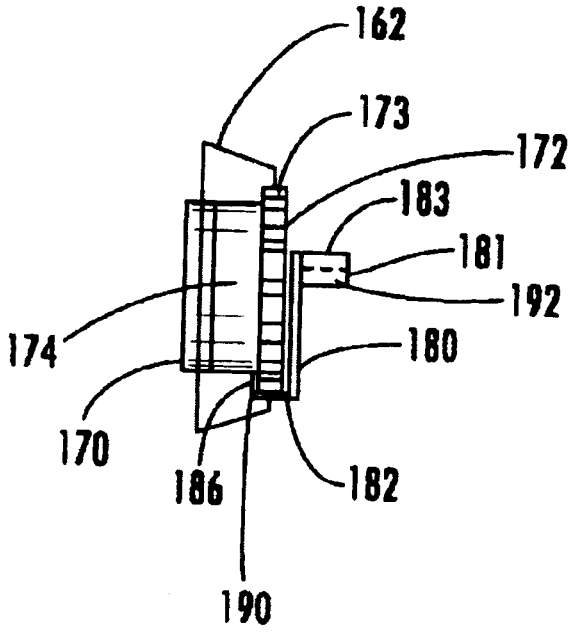
FIG. 29 is a side view, partly in section, of the second embodiment special yoke engaging the firearm barrel nut.
Figure 30:
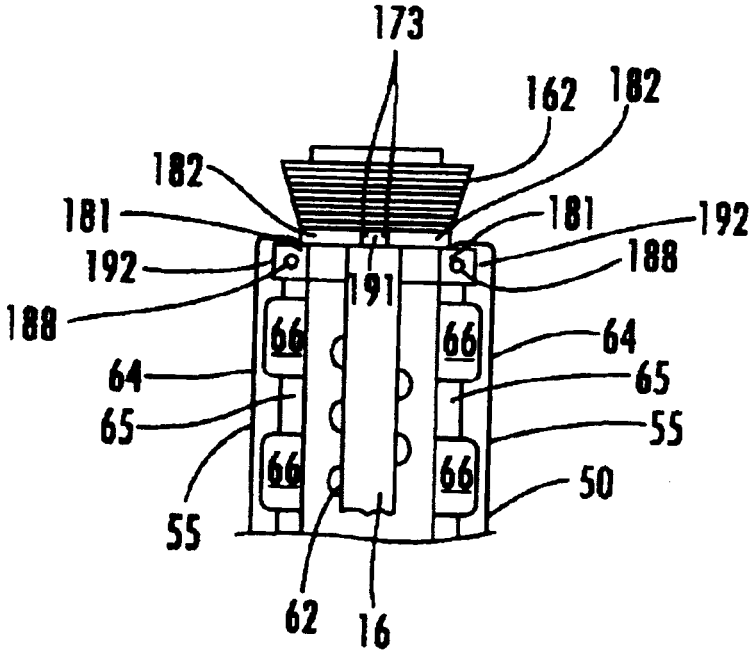
FIG. 30 is a bottom view of the second embodiment special yoke engaged to the barrel nut.

In another embodiment of the invention, the special yoke upright elements 181 have generally rectangular block-like elements 192 protruding laterally sideways. See FIGS. 26A–27. The top 193 of each laterally protruding element 192 each has a threaded, vertical aperture 188 formed therethrough. The top 193 of each laterally protruding element 192 also has an indentation 189 formed therein about each said aperture 188. Each indentation 189 is adapted to receive a screw head. As may be seen from FIGS. 28A and 28B, in this embodiment of the invention the upper handguard piece 50 has a small, circular, vertical aperture 63 formed through the longitudinal element 64 along each upper hand guard piece side 55 separating the shallow upper channel 60 from the bottom interface channel 61. The aperture 63 is formed near to the rear 52 of the upper hand guard piece 50. A notch 67 is also formed in the upper handguard piece cut out portion 65 at the upper handguard rear 52. The special yoke laterally protruding elements 192 each engage an upper handguard piece notch 67. Referring also to FIGS. 29 and 30, threaded screws 195 are inserted through the upper handguard piece small, circular, vertical apertures 63 for threaded engagement with the special yoke vertical apertures 188. The upper handguard piece 50 is then supported not only by the rear portion underside 40 to the receiver top 13, but also by the engagement of the upper handguard piece 50 with the special yoke 180. The special yoke 180 is joined to the barrel nut 170 and optionally held in position by the delta ring 162. The special yoke 180 does not touch the firearm barrel 16. Additional downward pressure on the upper handguard piece top 53 translates by means of the special yoke 180 to the firearm barrel nut 170. The firearm barrel nut 170 and special yoke 180 are made from steel thereby slowing down heat transfer from the firearm barrel 16 to the aluminum upper receiver 12.

It is understood that the above-described embodiment is merely illustrative of the application. Other embodiments may be readily devised by those skilled in the art which will embody the principles of the invention and fall within the spirit and scope thereof.

I claim:

1. In combination:

a modular sleeve for interfacing modular enhancements to a firearm, said firearm having minimally a receiver with a stock and barrel attached thereto, said barrel defining the forward portion of the firearm and said stock defining the rearward portion of the firearm, said firearm longitudinal axis being defined as horizontal and running from said stock through said receiver to said barrel, said receiver having a forward portion, a top and a rearward portion, said barrel being joined to the forward portion of the receiver, said stock being joined to the rearward portion of the receiver, said barrel being detachable secured to a screw-threaded barrel port on said receiver forward portion by means of a barrel nut having a generally cylindrical body with a central longitudinal threaded opening permitting the nut to be slid over the firearm barrel, said barrel nut threaded opening adapted to engage the screw-threaded barrel port, said barrel nut having a forward end with a plurality of prongs protruding radially outward from the barrel nut body, said modular sleeve comprising:

a universal receiver sleeve having a top side, an underside and two opposite sides connecting said top side with said underside, said universal receiver sleeve being further defined as having a forward portion and a rear portion, the underside of the rear portion of the universal receiver sleeve being fixedly attached to the firearm receiver top, said receiver sleeve forward portion extended forward above the firearm barrel;

an upper handguard piece having a front, rear, top, open bottom, opposing sides, outer side surfaces and inner side surfaces, said top, sides and bottom defining a hollow interior, said front and rear defining an upper handguard piece longitudinal axis, said upper handguard piece top being joined to the underside of the forward portion of the receiver sleeve, each said outer side surface having two longitudinal channels formed therein, a large and shallow upper channel and a bottom interface channel, said channels being separated by a longitudinal element, said bottom interface channel being positioned near to the upper hand guard piece bottom, said upper handguard piece having a small, circular horizontal aperture formed through each upper hand guard piece side near to the rear in the bottom interface channel;

a bottom handguard piece having a front, rear, open top, bottom, opposing sides, outer side surfaces and inner side surfaces, said bottom, sides and top defining a hollow interior, said front and rear defining a bottom handguard piece longitudinal axis, said bottom handguard piece being removably attached to the upper handguard piece;

wherein, said upper handguard piece and attached bottom handguard piece surround the firearm barrel without touching said barrel;

a modular sleeve yoke, comprising:

a U-shaped device having two upright elements interconnected by a curvilinear element, said device having a top, bottom, front, rear and two opposite sides, said curvilinear element containing said device bottom, said upright elements terminating at the device top, said upright elements being generally rectangular block-like elements protruding forwardly away from said device rear, each upright element having two sides, each upright element having at least one threaded, lateral aperture formed therethrough, said device rear having a channel flange formed on the curvilinear element at the device bottom opening upward;

wherein, said device rear is positioned at and against the forward end of the barrel nut, said device adapted to engage the barrel nut body while the channel flange a plurality of prongs;

a threaded screw inserted through each upper handguard piece small, circular horizontal aperture for threaded engagement with each device upright element threaded, lateral aperture.

2. The combination as recited in claim 1, further comprising:

an indentation formed about one side of each said device, upright element, threaded, lateral aperture, each said indentation adapted to receive a screw head.

3. The combination as recited in [claim 2] *claim 1*, further comprising:

a rectangular notch formed in the channel flange at the device bottom.

4. The combination as recited in [claim 3] *claim 1*, wherein:

said firearm has a conventional handguard delta ring, a delta ring spring, and a delta ring lock washer, mounted on said screw-threaded barrel port;

wherein said delta ring substantially covers the barrel nut and a portion of the special yoke.

5. The combination as recited in [claim 4] *claim 1*, wherein:

said barrel nut and modular sleeve yoke are each made from steel.

6. In combination:

a modular sleeve for interfacing modular enhancements to a firearm, said firearm having minimally a receiver with a stock and barrel attached thereto, said barrel defining the forward portion of the firearm and said stock defining the rearward portion of the firearm, said firearm longitudinal axis being defined as horizontal and running from said stock through said receiver to said barrel, said receiver having a forward portion, a top and a rearward portion, said barrel being joined to the forward portion of the receiver, said stock being joined to the rearward portion of the receiver, said barrel being detachable secured to a screw-threaded barrel port on said receiver forward portion by means of a barrel nut having a generally cylindrical body with a central longitudinal threaded opening permitting the nut to be slid over the firearm barrel, said barrel nut threaded opening adapted to engage the screw-threaded barrel port, said barrel nut having a forward end with a plurality of prongs protruding radially outward from the barrel nut body, said modular sleeve comprising:

a universal receiver sleeve having a top side, an underside and two opposite sides connecting said top side with said underside, said universal receiver sleeve being further defined as having a forward portion and a rear portion, the underside of the rear portion of the universal receiver sleeve being fixedly attached to the firearm receiver top, said receiver sleeve forward portion extended forward above the firearm barrel;

an upper handguard piece having a front, rear, top, open bottom, opposing sides, outer side surfaces and inner side surfaces, said top, sides and bottom defining a hollow interior, said front and rear defining an upper handguard piece longitudinal axis, said upper handguard piece top being joined to the underside of the forward portion of the receiver sleeve, each said outer side surface having two longitudinal channels formed therein, a large and shallow upper channel and a bottom interface channel, said channels being separated by a longitudinal element, said bottom interface channel being positioned near to the upper hand guard piece bottom, said upper handguard piece having a small, circular vertical aperture formed through the longitudinal element along each upper hand guard piece side near to the upper handguard piece rear, said upper hand guard piece side having a notch formed along the bottom at the rear;

a bottom handguard piece having a front, rear, open top, bottom, opposing sides, outer side surfaces and inner side surfaces, said bottom, sides and top defining a hollow interior, said front and rear defining a bottom handguard piece longitudinal axis, said bottom handguard piece being removably attached to the upper handguard piece;

wherein, said upper handguard piece and attached bottom handguard piece surround the firearm barrel without touching said barrel;

a modular sleeve yoke, comprising:

a U-shaped device having two upright elements interconnected by a curvilinear element, said device having a top, bottom, front, rear and two opposite sides, said curvilinear element containing said device bottom, said upright elements terminating at the device top, said upright elements having generally rectangular block-like elements protruding laterally sideways, each laterally protruding block-like elements having a top with at least one threaded, vertical aperture formed there through, said device rear having a channel flange formed on the curvilinear element at the device bottom opening upward;

wherein, said device rear is positioned at and against the forward end of the barrel nut, said device adapted to engage the barrel nut body while the channel flange a plurality of prongs;

a threaded screw inserted through each upper handguard piece small, circular vertical aperture for threaded engagement with each device upright element protruding block-like element threaded, vertical aperture;

wherein, each the top of each laterally protruding block-like element engages each upper hand guard piece side notch.

7. The combination as recited in claim 6, further comprising:

an indentation formed on the top of each laterally protruding block-like element said device, about each threaded, vertical aperture.

8. The combination as recited in [claim 7] *claim 6*, further comprising:

a rectangular notch formed in the channel flange at the device bottom.

9. The combination as recited in [claim 8] *claim 6*, wherein:

said firearm has a conventional handguard delta ring, a delta ring spring, and a delta ring lock washer, mounted on said screw-threaded barrel port;

wherein said delta ring substantially covers the barrel nut and a portion of the special yoke.

10. The combination as recited in [claim 9] *claim 6*, wherein:

said barrel nut and modular sleeve yoke are each made from steel.

*11. A system for attaching modular enhancements to a firearm, said firearm having a receiver, said receiver having a top and a barrel receiving receptacle at a forward end thereof, said firearm further including a barrel received in said barrel receiving receptacle and a barrel nut received around an outer surface of said barrel receiving receptacle to retain said barrel within said barrel receiving receptacle, said system comprising:*

*a receiver sleeve having a top, an underside, a forward portion and a rear portion, wherein the underside of the rear portion of the receiver sleeve is configured and arranged to be fixedly attached to the top of said firearm receiver and said forward portion of said receiver sleeve is configured to extend above at least a portion of the firearm barrel;*

*a handguard piece depending from the underside of the forward portion of the receiver sleeve, said handguard piece having a side wall that forms a hollow interior cavity, a forward end, and a rearward end, wherein said sidewall of said handguard piece surrounds the firearm barrel without touching said barrel, said rearward end of said handguard piece being adjacent said forward end of said receiver when said receiver sleeve is attached to said firearm receiver; and*

*a yoke configured and arranged for engagement with said barrel nut, said yoke extending forwardly into said reward end of said handguard piece, said yoke being further configured and arranged for engagement with said rearward end of said handguard piece,*

*wherein said yoke supports said handguard piece relative to said receiver.*

*12. The system of claim 11 wherein said yoke includes means for releasably engaging said barrel nut, and further includes means for releasably engaging said rearward end of said handguard piece.*

*13. The system of claim 12 wherein said means for releasably engaging said barrel nut comprises a flange channel.*

*14. The system of claim 12 wherein said means for releasably engaging said rearward end of said handguard piece comprises a fastener extending through an aperture in said rearward end of the handguard piece, and into a threaded aperture in said yoke.*

*15. The system of claim 11, wherein said top side of said receiver sleeve includes a dovetail interface element extending longitudinally along at least a portion of the top of the receiver sleeve, said dovetail interface element being configured and arranged for the mounting of ancillary equipment.*

*16. The system of claim 11, further comprising:*

*at least one external dovetail interface element arranged on the sidewall of said handguard piece, said external dovetail element being configured and arranged for the mounting of ancillary equipment.*

*17. The system of claim 16 wherein said at least one external dovetail interface element is removably secured to said sidewall of said handguard piece.*

*18. The system of claim 16, wherein said at least one external dovetail interface element comprises:*

*three external dovetail interface elements arranged on the sidewall of said handguard piece at 3:00, 6:00 and 9:00 positions.*

*19. The system of claim 18 wherein said external dovetail interface elements are removably secured to said sidewall of said handguard piece.*

*20. A system for attaching modular enhancements to a firearm, said firearm having a receiver, said receiver having a top and a barrel receiving receptacle at a forward end thereof, said firearm further including a barrel received in said barrel receiving receptacle and a barrel nut received around an outer surface of said barrel receiving receptacle to retain said barrel within said barrel receiving receptacle, said system comprising:*

*a receiver sleeve having a top, an underside, a forward portion and a rear portion, wherein the underside of the rear portion of the receiver sleeve is configured and arranged to be fixedly attached to the top of said firearm receiver and said forward portion of said receiver sleeve is configured to extend above at least a portion of the firearm barrel;*

*an upper handguard piece depending from the underside of the forward portion of the receiver sleeve, said upper handguard piece having a side wall that forms a hollow interior cavity, a forward end, and a rearward end, wherein said sidewall of said handguard piece at least partially surrounds the firearm barrel without touching said barrel, said rearward end of said handguard piece being adjacent said forward end of said receiver when said receiver sleeve is attached to said firearm receiver; and*

*a yoke configured and arranged for engagement with said barrel nut, said yoke extending forwardly toward said reward end of said upper handguard piece, said yoke being further configured and arranged for engagement with said rearward end of said upper handguard piece,*

*wherein said yoke supports said upper handguard piece relative to said receiver.*

*21. The system of claim 20 wherein said yoke includes means for releasably engaging said barrel nut, and further includes means for releasably engaging said rearward end of said upper handguard piece.*

*22. The system of claim 21 wherein said means for releasably engaging said barrel nut comprises a flange channel.*

*23. The system of claim 21 wherein said means for releasably engaging said rearward end of said upper handguard piece comprises a fastener extending through an aperture in said rearward end of the upper handguard piece, and into a threaded aperture in said yoke.*

*24. The system of claim 20, wherein said top side of said receiver sleeve includes a dovetail interface element extending longitudinally along at least a portion of the top of the receiver sleeve, said dovetail interface element being configured and arranged for the mounting of ancillary equipment.*

*25. The system of claim 20, further comprising:*

*at least one external dovetail interface element arranged on the sidewall of said handguard piece, said external dovetail element being configured and arranged for the mounting of ancillary equipment.*

*26. The system of claim 25 wherein said at least one external dovetail interface element is removably secured to said sidewall of said handguard piece.*

*27. The system of claim 25, wherein said at least one external dovetail interface element comprises:*

*three external dovetail interface elements arranged on the sidewall of said handguard piece at 3:00, 6:00 and 9:00 positions.*

*28. The system of claim 27 wherein said external dovetail interface elements are removably secured to said sidewall of said handguard piece.*

*29. A system for attaching modular enhancements to a firearm, said firearm including a receiver having a forward portion and a top, and further including a barrel joined to the forward portion of the receiver, said system comprising:*

*a receiver sleeve having a top, an underside, a forward portion and a rear portion, wherein the underside of the rear portion of the receiver sleeve is configured and arranged to be fixedly attached to the top of said firearm receiver and said forward portion of said receiver sleeve is configured to extend above at least a portion of the firearm barrel;*

*a handguard piece depending from the underside of the forward portion of the receiver sleeve, said handguard piece having a side wall that forms a hollow interior cavity, a forward end, and a rearward end, wherein said sidewall of said handguard piece surrounds the firearm barrel without touching said barrel, said rearward end of said handguard piece being adjacent said forward end of said receiver when said receiver sleeve is attached to said firearm receiver; and*

*a yoke element coupled to said forward portion of said receiver, said yoke element extending forwardly from said receiver into said rearward end of said handguard piece, said yoke element being configured and arranged for engagement with said rearward end of said handguard piece,*

*wherein said yoke element supports said handguard piece relative to said receiver.*

*30. A system for attaching modular enhancements to a firearm, said firearm including a receiver having a forward portion and a top, and further including a barrel joined to the forward portion of the receiver, said system comprising:*

*a receiver sleeve having a top, an underside, a forward portion and a rear portion, wherein the underside of the rear portion of the receiver sleeve is configured and arranged to be fixedly attached to the top of said firearm receiver and said forward portion of said receiver sleeve is configured to extend above at least a portion of the firearm barrel;*

*a handguard piece depending from the underside of the forward portion of the receiver sleeve, said handguard piece having a side wall that forms a hollow interior cavity, a forward end, and a rearward end, wherein said sidewall of said handguard piece surrounds the firearm barrel without touching said barrel, said rearward end of said handguard piece being adjacent said forward end of said receiver when said receiver sleeve is attached to said firearm receiver; and*

*a supporting element engaged with said forward portion of said receiver, said supporting element extending forwardly from said forward portion of said receiver into said reward end of said handguard piece, said supporting element being configured and arranged for engagement with said rearward end of said handguard piece,*

*wherein said supporting element supporting said handguard piece relative to said receiver.*

*31. A system for attaching modular enhancements to a firearm, said firearm having a receiver, said receiver having a top and a barrel receiving receptacle at a forward end thereof, said firearm further including a barrel received in said barrel receiving receptacle and a barrel nut received around an outer surface of said barrel receiving receptacle*

*to retain said barrel within said barrel receiving receptacle, said system comprising:*

*an upper handguard piece having a forward end and a rearward end, and further having a dovetail rail extending longitudinally between the forward end and the rearward end;*

*a U-shaped supporting yoke removably secured to said rearward end of said upper hand guard,*

*said U-shaped supporting yoke including engagement surfaces configured to cooperatively engage an outer surface of said barrel nut and thereby support said upper handguard piece relative to said barrel nut,*

*wherein said upper handguard piece extends from said forward end of said upper receiver forwardly above said barrel without engaging said barrel.*

*32. The system of claim 31, wherein said upper handguard piece includes opposing side walls that extend outwardly and downwardly from said dovetail rail, said opposing side walls terminating in opposing interface channels.*

*33. The system of claim 32 wherein each of said longitudinally extending interface channels has an upper wall and a lower wall, and said lower wall comprises a plurality of spaced wall segments.*

*34. The system of claim 31 further comprising a bottom firearm accessory, said upper handguard piece and said bottom firearm accessory including interfitting mating formations for removably securing said bottom firearm accessory to said upper handguard piece.*

*35. The system of claim 32 further comprising a bottom firearm accessory having opposing side walls that extend outwardly and upwardly, said opposing sidewalls including protrusions that interfittingly engage within said interface channels.*

*36. The system of claim 33 further comprising a bottom firearm accessory having opposing sidewalls that extend outwardly and upwardly, said opposing sidewalls including protrusions that interfittingly engage within said interface channels, said protrusions comprising a plurality of spaced protrusions that matingly interfit between said spaced wall segments.*

* * * * *

US00RE39465C1

(12) INTER PARTES REEXAMINATION CERTIFICATE (0169th)

United States Patent
Swan

(10) Number: US RE39,465 C1
(45) Certificate Issued: Jul. 13, 2010

(54) MODULAR SLEEVE YOKE

(76) Inventor: Richard E. Swan, 171 West St., East Bridgewater, MA (US) 02333

Reexamination Request:
No. 95/000,218, Jan. 23, 2007

Reexamination Certificate for:

| | |
|---|---|
| Patent No.: | **Re. 39,465** |
| Issued: | **Jan. 16, 2007** |
| Appl. No.: | **10/811,794** |
| Filed: | **Mar. 29, 2004** |

Related U.S. Patent Documents

Reissue of:

| | |
|---|---|
| (64) Patent No.: | **6,499,245** |
| Issued: | **Dec. 31, 2002** |
| Appl. No.: | **10/061,515** |
| Filed: | **Feb. 1, 2002** |

Related U.S. Application Data

(63) Continuation-in-part of application No. 10/007,590, filed on Dec. 10, 2001, now Pat. No. 6,490,822.
(60) Provisional application No. 60/274,147, filed on Mar. 9, 2001.

(51) Int. Cl.
*F41C 43/00* (2006.01)

(52) U.S. Cl. ..... 42/71.01; 42/75.01; 42/124

(58) Field of Classification Search ..... None
See application file for complete search history.

(56) References Cited

U.S. PATENT DOCUMENTS

| | | | | |
|---|---|---|---|---|
| 5,198,600 A | * | 3/1993 | E'Nama | 42/90 |
| 5,343,650 A | * | 9/1994 | Swan | 42/117 |
| 5,533,292 A | * | 7/1996 | Swan | 42/123 |
| 5,590,484 A | * | 1/1997 | Mooney et al. | 42/111 |

* cited by examiner

*Primary Examiner*—Jeffrey R. Jastrzab

(57) ABSTRACT

A Swan universal receiver sleeve attached to the top of a firearm upper receiver and extended forward above the firearm barrel to a position just short of the firearm front sight. The underside of the rear portion of the sleeve is fixedly attached to the receiver top. The underside of the forward portion of the sleeve has an upper handguard piece attached thereto. A bottom handguard piece is fitted about the bottom of the gun barrel and is attached to the upper handguard piece. The handguard pieces are not physically connected in any way to the gun barrel. The sleeve is self supported by the connection of the rear portion underside to the receiver top. A special yoke is inserted about the barrel nut of the firearm to which the modular sleeve is attached. The special yoke reinforces the modular sleeve while keeping the firearm barrel free floating.

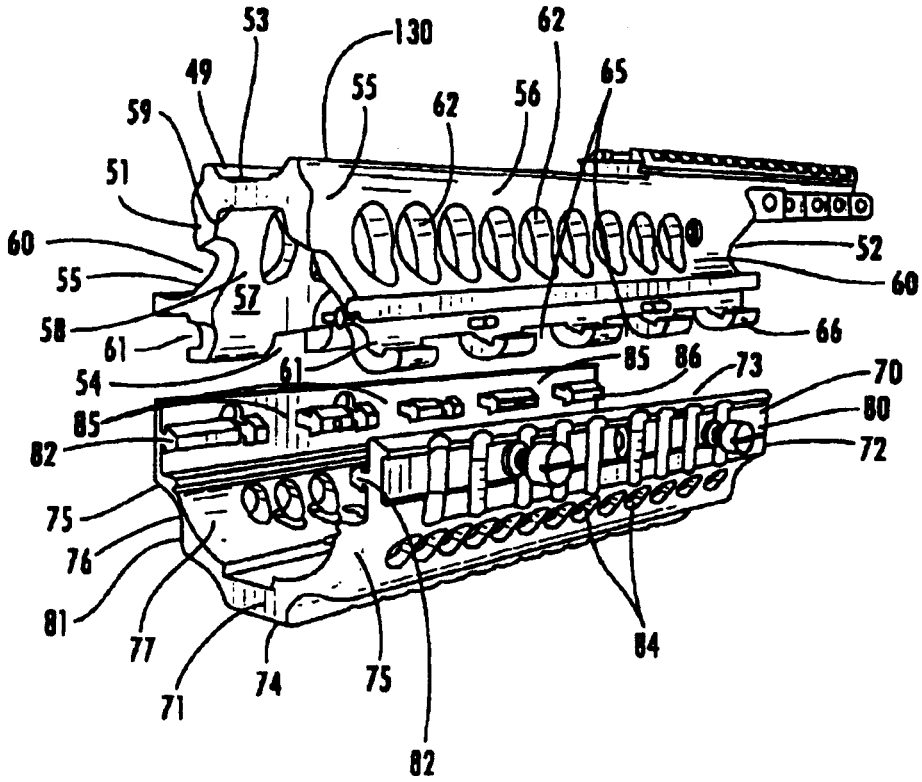

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 11-16, 20-25 and 31-36 is confirmed.

Claims 29 and 30 are cancelled.

Claims 1-10, 17-19 and 26-28 were not reexamined.

* * * * *